United States Patent
Young et al.

(10) Patent No.: US 11,615,168 B2
(45) Date of Patent: Mar. 28, 2023

(54) METHOD AND SYSTEM FOR GENERATING AND VERIFYING LICENSES WITH MULTIPLE SIGNATURES

(71) Applicant: Dell Products L.P., Hopkinton, MA (US)

(72) Inventors: Jason Matthew Young, Round Rock, TX (US); Marshal F. Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 17/080,900

(22) Filed: Oct. 27, 2020

(65) Prior Publication Data

US 2022/0129525 A1 Apr. 28, 2022

(51) Int. Cl.
*G06F 21/10* (2013.01)
*G06F 21/64* (2013.01)
(Continued)

(52) U.S. Cl.
CPC .............. *G06F 21/105* (2013.01); *G06F 8/61* (2013.01); *G06F 21/64* (2013.01); *H04L 9/0825* (2013.01); *H04L 9/3263* (2013.01); *G06F 2221/0773* (2013.01); *G06Q 2220/10* (2013.01); *G06Q 2220/18* (2013.01)

(58) Field of Classification Search
CPC .......... G06F 21/105; G06F 8/61; G06F 21/64; G06F 2221/0773; G06Q 2220/18
See application file for complete search history.

(56) References Cited

U.S. PATENT DOCUMENTS 6,557,105 B1 * 4/2003 Tardo ................... G06F 21/105
713/193
6,952,769 B1 * 10/2005 Dubey .................... H04L 67/14
713/153

(Continued)

OTHER PUBLICATIONS

M. Dalheimerand F. -J. Pfreundt, "GenLM: License Management for Grid and Cloud Computing Environments," 2009 9th IEEE/ACM International Symposium on Cluster Computing and the Grid, 2009, pp. 132-139, doi: 10.1109/CCGRID.2009.31.*

(Continued)

*Primary Examiner* — Steven S Kim
(74) *Attorney, Agent, or Firm* — Chamberlain, Hrdlicka, White, Williams & Aughtry

(57) ABSTRACT

A method for verifying licenses is performed by a legacy management controller (LMC) and a non-legacy management controller (NLMC). The method includes obtaining, by the LMC, a first license installation request and a license, wherein the license comprises license data and a plurality of signatures; in response to the first license installation request: making a first determination, by the LMC, that a first signature of the plurality of signatures is valid; in response to the first determination: installing, by the LMC, the license on the LMC; obtaining, by the NLMC, a second license installation request and the license; in response to the second license installation request: making a second determination, by the NLMC, that a second signature of the plurality of signatures is valid; and in response to the second determination: installing, by the NLMC, the license on the NLMC.

15 Claims, 14 Drawing Sheets

(51) Int. Cl.
*H04L 9/32* (2006.01)
*G06F 8/61* (2018.01)
*H04L 9/08* (2006.01)

(56) References Cited

U.S. PATENT DOCUMENTS

| | | | |
|---|---|---|---|
| 7,512,782 B2* | 3/2009 | Kaier | G06F 21/31 |
| | | | 705/51 |
| 8,417,954 B1* | 4/2013 | Sagal | G06F 21/64 |
| | | | 713/176 |
| 2004/0039916 A1* | 2/2004 | Aldis | G06F 21/105 |
| | | | 713/177 |
| 2004/0039926 A1* | 2/2004 | Lambert | G06F 21/125 |
| | | | 713/189 |
| 2004/0054901 A1* | 3/2004 | England | H04L 63/12 |
| | | | 713/168 |
| 2004/0078565 A1* | 4/2004 | Hofmeister | G06F 21/51 |
| | | | 713/182 |
| 2010/0017888 A1* | 1/2010 | Zhang | G06F 21/10 |
| | | | 713/176 |
| 2011/0029779 A1* | 2/2011 | Sekiya | H04W 12/08 |
| | | | 713/176 |
| 2015/0363576 A1* | 12/2015 | Medvinsky | H04L 63/126 |
| | | | 726/26 |
| 2017/0041346 A1* | 2/2017 | Shvarts | H04L 63/08 |
| 2022/0129525 A1* | 4/2022 | Young | H04L 9/3263 |

OTHER PUBLICATIONS

L. Catuogno, C. Galdi and G. Persiano, "Secure Dependency Enforcement in Package Management Systems," in IEEE Transactions on Dependable and Secure Computing, vol. 17, No. 2, pp. 377-390, Mar. 1-Apr. 2020, doi: 10.1109/TDSC.2017.2777991.*

* cited by examiner

METHOD AND SYSTEM FOR GENERATING AND VERIFYING LICENSES WITH MULTIPLE SIGNATURES

BACKGROUND

Computing devices may include any number of internal components such as processors, memory, and persistent storage. Each of the internal components of a computing device may be used to generate data. The data may be sensitive and may be protected. The process of generating, storing, and protecting data may utilize computing resources of the computing devices such as processing and storage. The utilization of the aforementioned computing resources to protect data may impact the overall performance of the computing resources.

SUMMARY

In general, in one aspect, the invention relates to a method performed to verify licenses. The method includes obtaining, by a legacy management controller, a first license installation request and a license, wherein the license comprises license data and a plurality of signatures; in response to the first license installation request: making a first determination, by the legacy management controller, that a first signature of the plurality of signatures is valid, wherein the validation of the first signature is performed using a legacy management controller public certificate associated with the legacy management controller; in response to the first determination: installing, by the legacy management controller, the license on the legacy management controller; obtaining, by a non-legacy management controller, a second license installation request and the license; in response to the second license installation request: making a second determination, by the non-legacy management controller, that a second signature of the plurality of signatures is valid, wherein the validation of the second signature is performed using a non-legacy management controller public certificate associated with the non-legacy management controller; and in response to the second determination: installing, by the non-legacy management controller, the license on the non-legacy management controller.

In general, in one aspect, the invention relates to a system that includes one or more processors, and a legacy management controller and a non-legacy management controller, which when executed by the one or more processors perform a method. The method includes obtaining, by the legacy management controller, a first license installation request and a license, wherein the license comprises license data and a plurality of signatures; in response to the first license installation request: making a first determination, by the legacy management controller, that a first signature of the plurality of signatures is valid, wherein the validation of the first signature is performed using a legacy management controller public certificate associated with the legacy management controller; in response to the first determination: installing, by the legacy management controller, the license on the legacy management controller; obtaining, by a non-legacy management controller, a second license installation request and the license; in response to the second license installation request: making a second determination, by the non-legacy management controller, that a second signature of the plurality of signatures is valid, wherein the validation of the second signature is performed using a non-legacy management controller public certificate associated with the non-legacy management controller; and in response to the second determination: installing, by the non-legacy management controller, the license on the non-legacy management controller.

In general, in one aspect, the invention relates to a non-transitory computer readable medium which includes computer readable program code, which when executed by a computer processor enables the computer processor to perform a method for verifying licenses. The method includes obtaining, by a legacy management controller, a first license installation request and a license, wherein the license comprises license data and a plurality of signatures; in response to the first license installation request: making a first determination, by the legacy management controller, that a first signature of the plurality of signatures is valid, wherein the validation of the first signature is performed using a legacy management controller public certificate associated with the legacy management controller; in response to the first determination: installing, by the legacy management controller, the license on the legacy management controller; obtaining, by a non-legacy management controller, a second license installation request and the license; in response to the second license installation request: making a second determination, by the non-legacy management controller, that a second signature of the plurality of signatures is valid, wherein the validation of the second signature is performed using a non-legacy management controller public certificate associated with the non-legacy management controller; and in response to the second determination: installing, by the non-legacy management controller, the license on the non-legacy management controller.

DETAILED DESCRIPTION

Figure 1A:
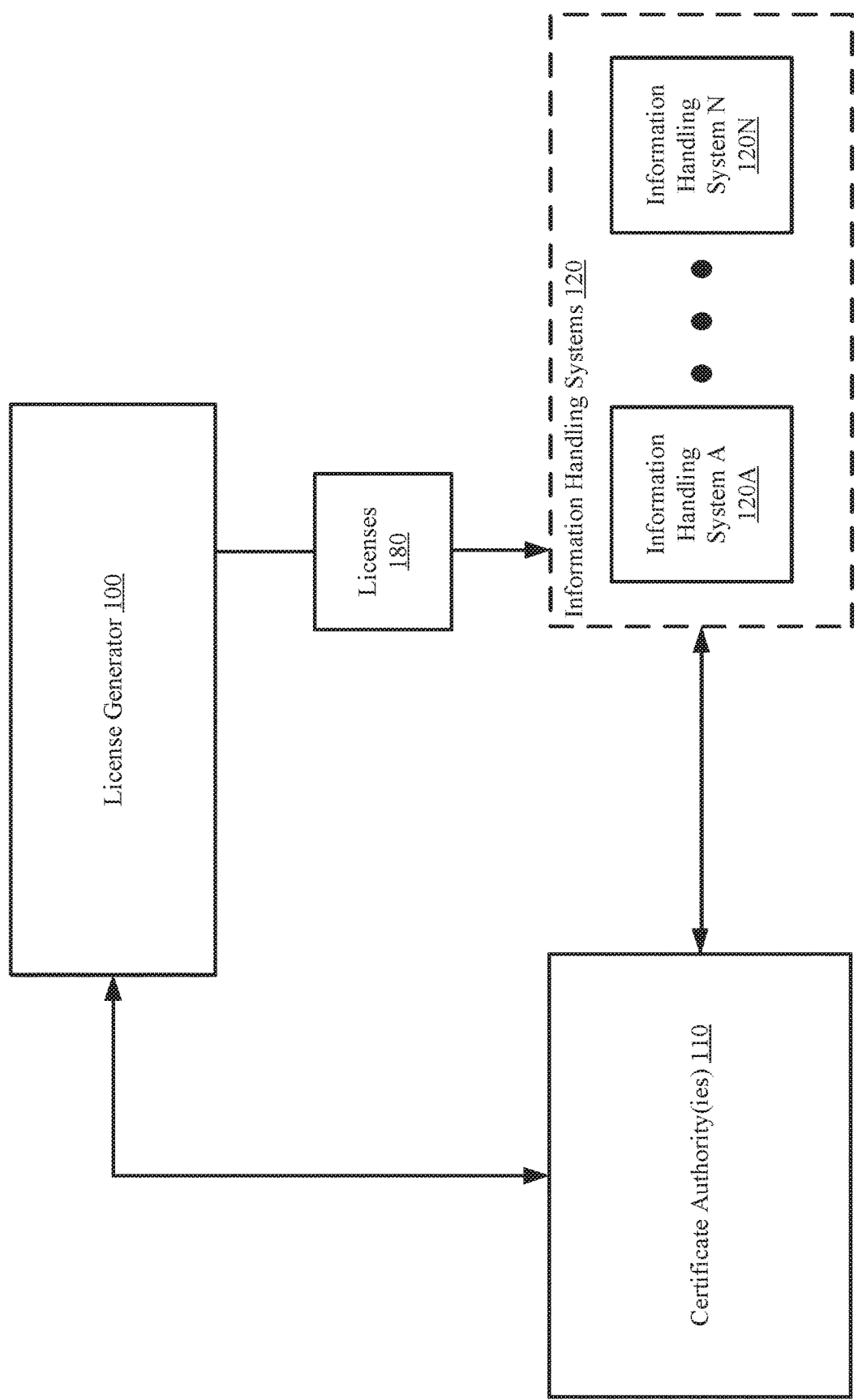
FIG. 1A shows a diagram of a system in accordance with one or more embodiments of the invention.

Specific embodiments of the invention will now be described in detail with reference to the accompanying figures. Like elements in the various figures are denoted by like reference numerals for consistency. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Licenses are used to install software across devices, e.g., management controllers, in a system to enable users to obtain services from the devices in the system. The system may include a multitude of devices and a multitude of device generations, e.g., legacy management controllers and non-legacy management controllers. In order to establish secure communications between devices and users, and verify trust between licenses and devices, licenses may include digital signatures associated with a device's private certificate. Embedded firmware in the device verifies a license is valid by verifying that the digital signature, which was created using the private certificate associated with the device, matches a public certificate that is stored in the firmware of the device. If the signature on the license does not match the stored public key of the public certificate, the device invalidates the license and fails the license installation.

Public certificates of a device may include a public key and private certificates may include a private key that is paired with the public key. The public key may be used to verify signatures generated using paired private key. Public and private key pairs are changed and updated across devices and device generations to eliminate the risk of a single key pair being used across all devices and potentially impacting all products if compromised.

Licenses associated with a specific device or device generations are not impacted by key changes. For example, legacy management controller licenses installed in legacy management controllers are not affected by legacy management controller key changes. However, licenses that are installed across multiple devices and device generations must create a unique license that is valid for each unique key pair associated with a device on which they are installed. Multiple licenses must be created to allow for each permutation of the license to be installed on each device and/or device generation. Each of these licenses must have unique names and information to differentiate between the other licenses and the devices on which they are to be installed. This leads duplications of licenses and may increase the complexity of managing the multiple licenses, especially for systems with a significant number of devices and device generations.

For example, consider a scenario in which a system includes a legacy management controller and a non-legacy management controller. Traditionally, to install a management software license on both the legacy management controller and the non-legacy management controller, one management software license must be generated and signed using the legacy management controller private certificate and another management software license must be generated and signed using the non-legacy management controller private certificate. For datacenters with multiple generations and significant numbers of computer systems with management controllers, generating, managing, and verifying licenses may be a complex process that may result in an inefficient use of computational resources.

To address the above issue, in general, embodiments of the invention relate to a system and method for generating and validating licenses that include multiple digital signatures that may be installed across multiple generations of devices. By including multiple signatures in licenses, a single license may be verified and installed across multiple generations of devices in a system.

A user of the system may send a license generation request to a license generator. The request may target devises in the system on which the license is to be installed. The devices may be management controllers. The management controllers may include multiple generations of management controllers. In response to obtaining the license generation request, the license generator may obtain private certificates associated with the management controllers targeted by the license generation request from one or more certificate authorities. The license generator may then generate the license and sign the license using the private keys of the obtained private certificates. The license generator may then send the license to the management controllers and initiate installation of the license on the management controllers. The license generator may delete the private certificates following the signing of the license to prevent the private certificates from becoming compromised.

Upon receiving a license installation request and a license, a management controller may determine whether the license is associated with a public key included in the public certificate possessed by the management controller. Older generation management controller, e.g., a legacy management controller, may include the functionality to compare only the first signature included in the license. The license generator may include the digital signature associated with the older generations of management controllers as the first signature to allow the proper verification of the license by the legacy management controllers. Newer generations of management controllers, e.g. non-legacy management controllers, may include the functionality to compare multiple signatures included in the license. The non-legacy management controllers may compare each signature included in the license with their public key. If a signature does not match, the non-legacy management controller may check the next signature until a match is found or all signatures have been checked. If a match is found, non-legacy management controller may validate and install the license. If a match is not found, the non-legacy management controller may invalidate the license and fail the installation of the license.

Turning to the figures, FIG. 1A shows a diagram of a system in accordance with one or more embodiments of the invention. The system may include a license generator (100), a certificate authority(ies) (110) and information handling systems (120). The information handling systems (120) may include one or more information handling systems, e.g. information handling system A (120A) and information handling system N (120N). The system may include additional, fewer, and/or different components without departing from the invention. Each component may be operably connected to any of the other components via any combination of wired and/or wireless connections. Each of the aforementioned components is discussed below.

In one or more embodiments of the invention, the license generator (100) includes the functionality to generate and provide licenses (180) to information handling systems (120). The license generator (100) may generate licenses (180) based on license generation requests obtained from one or more users of the system. The license generator (100) may use the license generation requests and management controller private certificates (discussed below) to generate and sign licenses (180). The license generator (100) may include any number of signatures in each license without departing from the invention. The license generator (100) may include other and/or additional functionality without departing from the invention. In one or more embodiments of the invention, the license generator (100) also, in addition to the aforementioned functionality, includes all, or a portion of the functionality of the certificate authority(ies) (110) for embodiments of the invention that do not include a certificate authority(ies) (110) without departing from the invention. For additional information regarding the license generator (100), refer to FIG. 1D.

Figure 5:
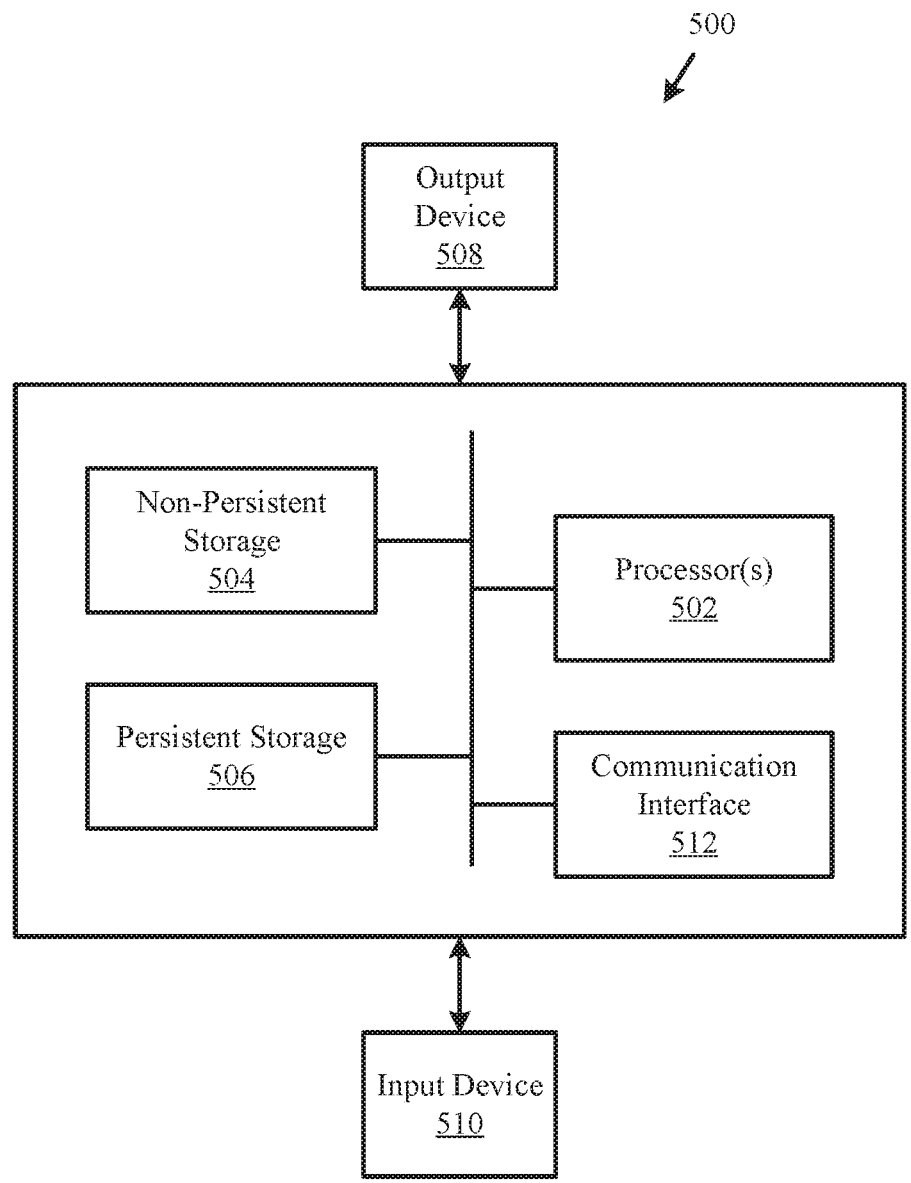
FIG. 5 shows a diagram of a computing device in accordance with one or more embodiments of the invention.

In one or more embodiments of the invention, the license generator (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the license generator (100) described throughout this application.

In one or more embodiments of the invention, the license generator (100) is implemented as a logical device. The logical device may utilize the computing resources of any number of computing devices and thereby provide the functionality of the license generator (100) described throughout this application.

In one or more embodiments of the invention, the certificate authority(ies) (110) include the functionality to generate and provide management controller public and/or private certificates (both discussed below) to information handling systems (120) and the license generator (100). The certificate authority(ies) (110) may include one or more certificate authorities (110) without departing from the invention. The certificate authority(ies) (110) may generate management controller public and private management controller certificates and provide management controller public certificates to information handling systems (120) when an information handling system (e.g., 120A, 120N) registers with the certificate authority(ies) (110). The certificate authority(ies) (110) may also provide management controller private certificates to the license generator (100) to generate license. The certificate authority(ies) (110) may include other and/or additional functionality without departing from the invention. For additional information regarding the certificate authority(ies) (110), refer to FIG. 1E.

In one or more embodiments of the invention, the certificate authority(ies) (110) is implemented as a computing device(s) (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the certificate authority(ies) (110) described throughout this application.

In one or more embodiments of the invention, the certificate authority(ies) (110) is implemented as a logical device(s). The logical device may utilize the computing resources of any number of computing devices and thereby provide the functionality of the certificate authority(ies) (110) described throughout this application.

In one or more embodiments of the invention, the information handling systems (120) include the functionality to provide computer implemented services. The computer implemented services may include, for example, database services, data storage services, electronic communications services, and/or other types of services that may be implemented using computing devices.

The information handling systems (120) may operate independently or cooperatively to provide the computer implemented services. For example, a single information handling system (e.g., 120A) may provide a computer implemented service on its own (i.e., independently) or may provide a computer implemented service cooperatively with one or more other information handling systems (e.g., 120N). The information handling systems (120) may include other and/or additional functionality without departing from the invention. For additional information regarding the information handling systems (120) refer to FIGS. 1B and 1C).

In one or more embodiments of the invention, the information handling systems (120) are implemented as computing devices (see e.g., FIG. 5). The computing devices may be, for example, a mobile phone, a tablet computer, a laptop computer, a desktop computer, a server, a distributed computing system, or a cloud resource. The computing devices may include one or more processors, memory (e.g., random access memory), and persistent storage (e.g., disk drives, solid state drives, etc.). The computing devices may include instructions, stored on the persistent storage, that when executed by the processor(s) of the computing devices cause the computing devices to perform the functionality of the information handling systems (120) described throughout this application.

In one or more embodiments of the invention, the information handling systems (120) are implemented as logical devices. The logical devices may utilize the computing resources of any number of computing devices and thereby provide the functionality of the information handling systems (120) described throughout this application.

Figure 1B:
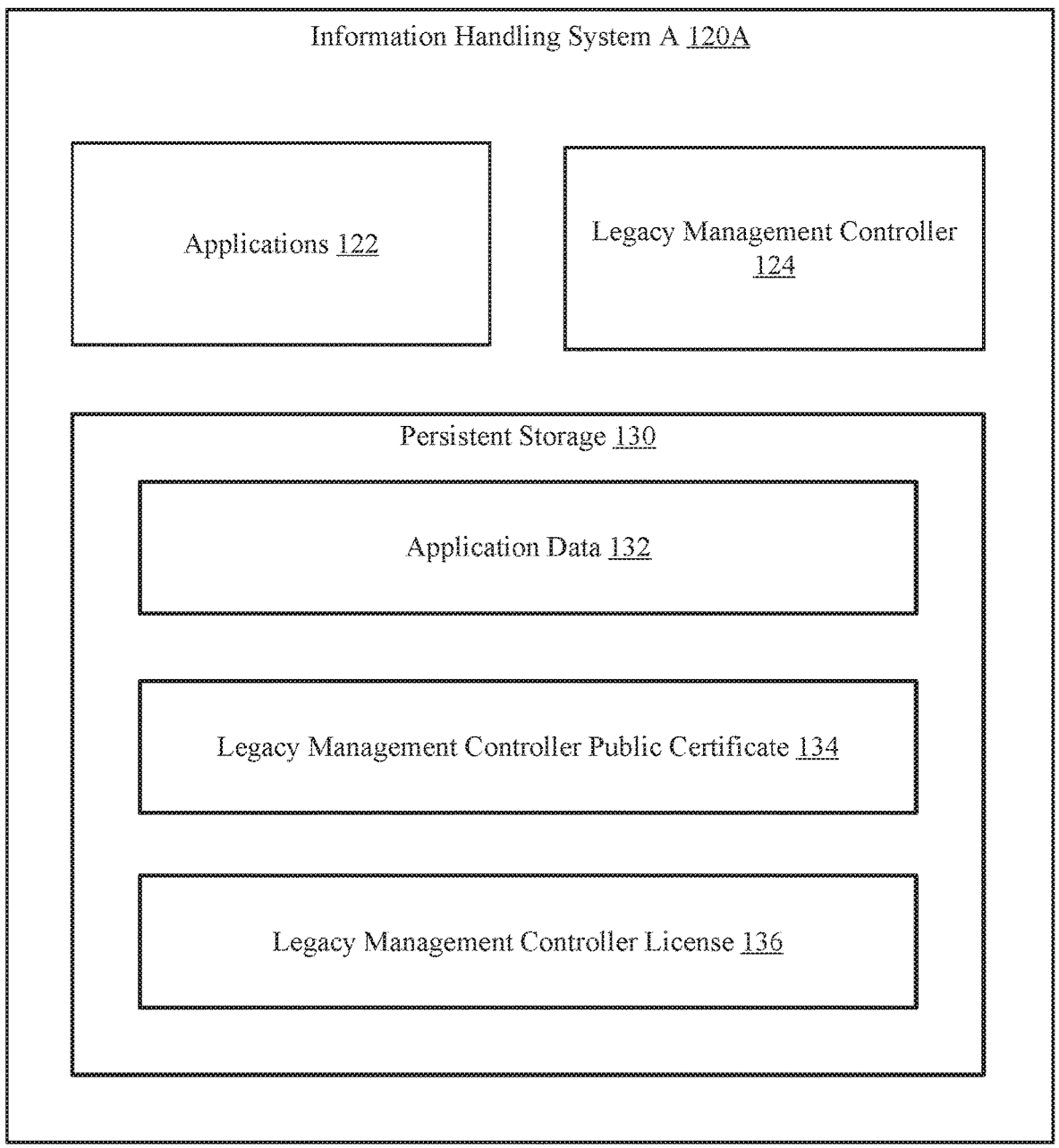
FIG. 1B show a diagram of an information handling system with a legacy management controller in accordance with one or more embodiments of the invention.

Turning to FIG. 1B, FIG. 1B show a diagram of an information handling system with a legacy management controller in accordance with one or more embodiments of the invention. Information handling system A (120A) may be an embodiment of information handling system A (120A) discussed above. As discussed above, information handling system A (120A) may provide computer implemented services to users of the system. Information handling system A (120A) may include applications (122), a legacy management controller (124), and persistent storage (124). Information handling system A (120A) may include additional, fewer, and/or different components without departing from the invention. Each of the aforementioned components is discussed below.

As discussed above, information handling system A (120A) may host applications (122). Information handling system A (120A) may host any number or type of applications (122) without departing from the invention. Different applications may provide similar or different functionalities. For example, an instant messaging application may provide instant messaging services, a database application may provide database services, etc. Some, or all, of the applications (122) may cooperatively provide services. The applications (122) may use the computing resources of information handling system A (120A) to provide the aforementioned computer implemented services. The applications (122) may provide other and/or additional services and include other and/or additional functionalities without departing from the invention.

In one or more embodiments of the invention, the applications (122) are implemented using a hardware device including circuitry. The hardware device may be, for example, digital signal processors, field programmable gate arrays, or application specific integrated circuits. The circuitry may be adapted to cause the hardware devices to perform the functionality of the applications (122). The applications (122) may be implemented using other types of hardware devices without departing from the invention.

In one or more embodiments of the invention, the applications (122) are implemented using a processor adapted to execute computing code stored on a persistent storage that when executed by the processor performs the functionality of the applications (122). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The legacy management controller (124) may include the functionality to manage the hardware devices of information handling system A (120A) and enable the applications (122) to utilize the computing resources provided by the hardware devices. For example, the legacy management controller (124) may manage requests for computing resources from the applications (122) and/or otherwise manage the operation of information handling system A (120A) in a manner that enables the applications (122) to utilize computing resources of the hardware devices.

The legacy management controller (124) may also include the functionality to verify and install licenses that enable applications to operate on information handling system A (120A). The legacy management controller (124) may (i) generate licenses using a legacy management controller public certificate (134), (ii) compare signatures included in the licenses with a signature generated using a legacy management controller public certificate (134) to verify the license, (iii) determine whether a license is valid based on the comparison, and (iv) install a license or fail installation of a license based on the determination. The legacy management controller (124) may be an older generation management controller and, therefore, only include the functionality to compare a single signature included in the license, i.e. the signature included in the first position of the ordered sequence (discussed below) of signatures included in a license. The legacy management controller (124) may include the functionality to perform the method depicted in FIG. 3B. The legacy management controller (124) may include other and/or additional functionality without departing from the invention.

In one or more embodiments of the invention, the legacy management controller (124) is implemented using a hardware device including circuitry. The hardware device may be, for example, a digital signal processor, a field programmable gate array, or an application specific integrated circuit. The circuitry may be adapted to cause the hardware device to perform the functionality of the legacy management controller (124). The legacy management controller (124) may be implemented using other types of hardware devices without departing from the invention.

In one or more embodiments of the invention, the legacy management controller (124) is implemented using a processor adapted to execute computing code stored on a persistent storage that when executed by the processor performs the functionality of the legacy management controller (124). The processor may be a hardware processor including circuitry such as, for example, a central processing unit or a microcontroller. The processor may be other types of hardware devices for processing digital information without departing from the invention.

In one or more embodiments of the invention, the persistent storage (130) stores data. The data stored in persistent storage (130) may include application data (132), a legacy management controller public certificate (134), and a legacy management controller license (136). The persistent storage (130) may store other and/or additional data without departing from the invention. Each of these data structures is discussed below.

In one or more embodiments of the invention, the application data (122) is one or more data structures that includes data generated by the applications (122). The application data may include for example, email data, database data, instant messaging data, and/or other and/or additional types of data that may be generated by the applications when providing computer implemented services without departing from the invention.

The legacy management controller public certificate (134) may be one or more data structures that may be used by the legacy management controller (124) to generate a signature to verify a signature included in a license is signed using legacy management controller private certificate (discussed below) that is associated with the legacy management controller public certificate (134). For additional information regarding the legacy management controller public certificate (134), refer to FIG. 2B.

The legacy management controller license (136) may be one or more data structures that allow a user to use the legacy management controller (124) and/or allow the legacy management controller to operate on information handling system A (120A). The legacy management controller license (136) may include license data and a single signature generated using a legacy management controller private certificate that is associated with the legacy management controller public certificate (134). The legacy management controller license (136) may only be installed on a legacy management controller (e.g., 124). The legacy management controller license may be generated by the license generator (100, FIG. 1A) and installed on the legacy management controller (124) by the legacy management controller (124) when the legacy management controller (124) was deployed to information handling system A (120A). The legacy management controller license (136) may be an embodiment of the licenses discussed below. For additional information regarding licenses, refer to FIG. 2A.

The persistent storage (130) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (130) may utilize portions of any combination of hard disk drives, solid state disk drives, tape drives, and/or any other physical storage medium of any number of computing devices.

Figure 1C:
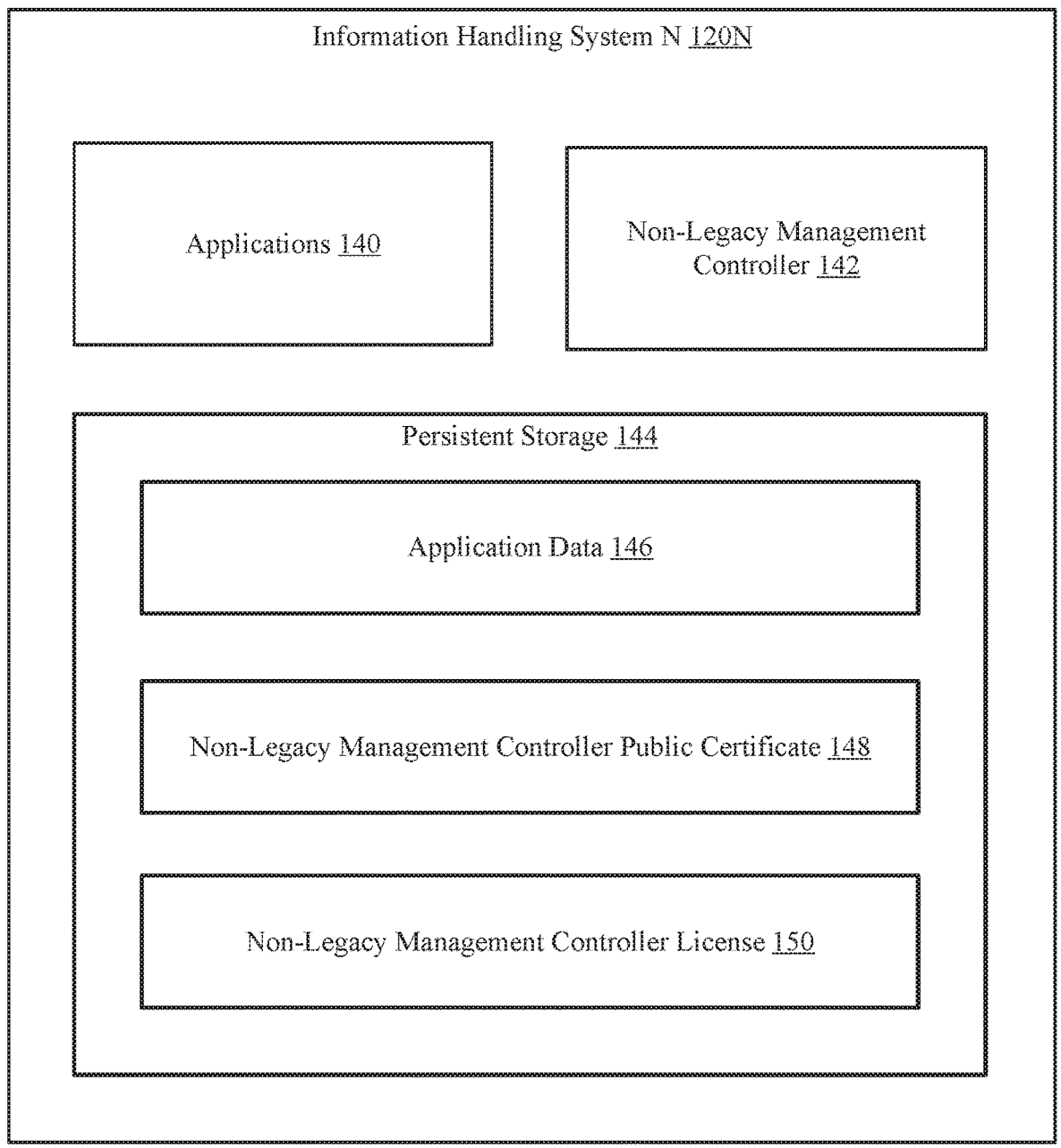
FIG. 1C shows a diagram of an information handling system with a non-legacy management controller in accordance with one or more embodiments of the invention.

FIG. 1C shows a diagram of an information handling system with a non-legacy management controller in accordance with one or more embodiments of the invention. Information handling system N (120N) may be an embodiment of the information handling systems (e.g., 120, FIG. 1A) discussed above. As discussed above, information handling system N (120N) may provide computer implemented services to users of the system. To perform the aforementioned functionality, information handling system N (120N) may include applications (140), a non-legacy management controller (142), and persistent storage (144). Information handling system N (120N) may include additional, fewer, and/or different components without departing from the invention.

The applications (140) may be an embodiment of the applications (122) discussed above. For additional information regarding the applications (140), refer to FIG. 1B.

The non-legacy management controller (1424) may include the functionality to manage the hardware devices of information handling system N (120N) and enable the applications (140) to utilize the computing resources provided by the hardware devices. For example, the non-legacy management controller (142) may manage requests for computing resources from the applications (140) and/or otherwise manage the operation of information handling system N (120N) in a manner that enables the applications (140) to utilize computing resources of the hardware devices.

The non-legacy management controller (142) may also include the functionality to verify and install licenses that enable applications (140) to operate on information handling system N (120N). The non-legacy management controller (142) may (i) generate licenses using a non-legacy management controller public certificate (148), (ii) compare signatures included in the licenses with a signature generated using a legacy management controller public certificate (148) to verify the license, (iii) determine whether a license is valid based on the comparison, and (iv) install a license or fail installation of a license based on the determination. The non-legacy management controller (142) may be an newer generation management controller and, therefore, include the functionality to compare any number of signatures included in the license, i.e. the signature included in the any position of the ordered sequence (discussed below) of signatures included in a license. The non-legacy management controller (142) may also include the functionality to identify flags included in licenses that indicate whether signatures are associated with generations of management controllers (e.g., legacy management controllers or non-legacy management controllers). The non-legacy management controller (142) may identify a subset of signatures included in a license that are associated with flags that correspond to the non-legacy management controller (142). The non-legacy management controller (142) may include the functionality to perform the method depicted in FIG. 3C. The non-legacy management controller (142) may include other and/or additional functionality without departing from the invention.

In one or more embodiments of the invention, the non-legacy management controller (142) is implemented using a hardware device including circuitry. The hardware device may be, for example, a digital signal processor, a field programmable gate array, or an application specific integrated circuit. The circuitry may be adapted to cause the hardware device to perform the functionality of the non-legacy management controller (142). The non-legacy management controller (142) may be implemented using other types of hardware devices without departing from the invention.

In one or more embodiments of the invention, the non-legacy management controller (142) is implemented using a processor adapted to execute computing code stored on a persistent storage that when executed by the processor performs the functionality of the non-legacy management controller (142). The processor may be a hardware processor including circuitry such as, for example, a central processing unit or a microcontroller. The processor may be other types of hardware devices for processing digital information without departing from the invention.

In one or more embodiments of the invention, the persistent storage (144) stores data. The data stored in persistent storage (144) may include application data (146), a non-legacy management controller public certificate (148), and a non-legacy management controller license (150). The persistent storage (144) may store other and/or additional data without departing from the invention. Each of these data structures is discussed below.

In one or more embodiments of the invention, the application data (136) is one or more data structures that includes data generated by the applications (136). The application data may include for example, email data, database data, instant messaging data, and/or other and/or additional types of data that may be generated by the applications when providing computer implemented services without departing from the invention.

The non-legacy management controller public certificate (148) may be one or more data structures that may be used by the non-legacy management controller (142) to generate a signature to verify a signature included in a license is signed using non-legacy management controller private certificate (discussed below) that is associated with the non-legacy management controller public certificate (148). For additional information regarding the non-legacy management controller public certificate (148), refer to FIG. 2B.

The non-legacy management controller license (150) may be one or more data structures that allow a user to use the non-legacy management controller (142) and/or allow the legacy management controller to operate on information handling system N (120N). The non-legacy management controller license (150) may include license data and a single signature generated using a non-legacy management controller private certificate that is associated with the non-legacy management controller public certificate (148). The non-legacy management controller license (150) may only be installed on a non-legacy management controller (e.g., 142). The non-legacy management controller license may be generated by the license generator (100, FIG. 1A) and installed on the non-legacy management controller (142) by the non-legacy management controller (142) when the non-legacy management controller (142) was deployed to information handling system N (120N). The non-legacy management controller license (150) may be an embodiment of the licenses discussed below. For additional information regarding licenses, refer to FIG. 2A.

The persistent storage (144) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (144) may utilize portions of any combination of hard disk drives, solid state disk drives, tape drives, and/or any other physical storage medium of any number of computing devices.

Figure 1D:
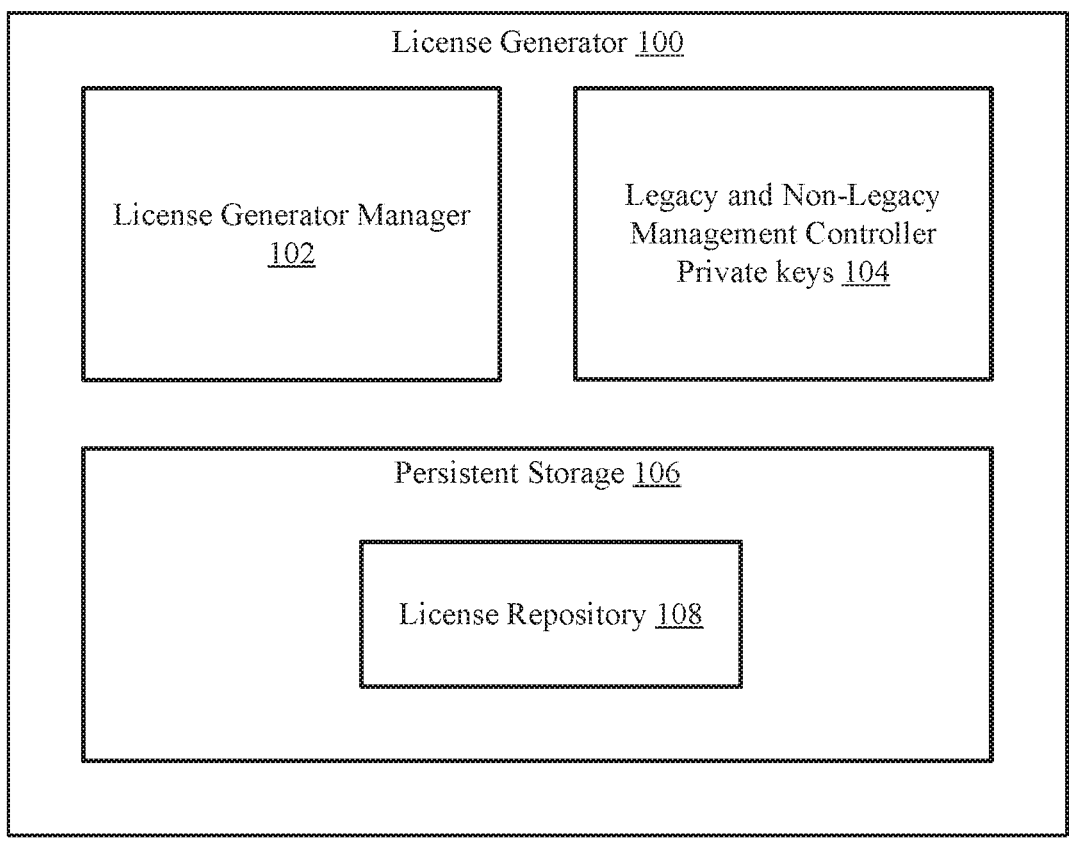
FIG. 1D shows a diagram of a license generator in accordance with one or more embodiments of the invention.

FIG. 1D shows a diagram of a license generator in accordance with one or more embodiments of the invention. The license generator (100) may be an embodiment of the license generator (100, FIG. 1A) discussed above. The license generator may generate and sign licenses as discussed above. To provide the aforementioned functionality, the license generator (100) may include a license generation manager (102) and persistent storage (106). The license generator (100) may include other and/or additional components without departing from the invention. Each component of the license generator (100) is discussed below.

The license generation manager (102) may include the functionality to (i) generate licenses, (ii) sign licenses, and (iii) initiate license installation across one or more management controllers of the information handling systems (120). The license generator manager (102) may obtain license generation requests from a user of the system, where the license generation request may target one or more management controllers (i.e., legacy management controller (124, FIG. 1B), non-legacy management controller (142, FIG. 1C)). The license generation manager (102) may also obtain legacy and non-legacy management controller private certificates (104) associated with the targeted management controllers from a certificate authority (e.g., 110, FIG. 1A). The license generation manager (102) may generate licenses and sign licenses using the private keys included in the legacy and non-legacy management controller private certificates (104). The license generation manager (102) may also set flags associated with each signature included in a license that indicate the generation of the management controller that is associated with each signature. The license generator manager (102) may delete non-legacy and legacy management controller private certificates (104) after signing licenses to prevent the legacy and non-legacy management controller private certificates (104, see e.g., FIGS. 2B and 2C) from becoming compromised.

The license generation manager (102) may also include the functionality to place the signatures in an ordered sequence on the license. The ordered sequence may refer to a collection of signatures, each with a designated position in the ordered sequence. The ordered sequence may include any number of signatures. For example, the license generation manager (102) may include a first signature in the first position of the ordered sequence, a second signature in the second position of the ordered sequence, and so on. The license generation manager (102) may place signatures associated with older generations of management controllers (i.e., legacy management controllers (e.g., 124, FIG. 1B) in the first position as older generations of management controllers may only include the functionality to verify a single license. The license generation manager (102) may place signatures associated with newer generations of management controllers (i.e., non-legacy management controllers (e.g., 142, FIG. 1B) in positions behind the signatures associated with the older generations of management controllers (i.e., second position, third position, etc.) as the newer generations of management controllers include the functionality to verify any number of signatures included in a license. The license generation manager (102) may include the functionality to perform the method shown in FIG. 3A. The license generator manager (102) may include other and/or additional functionality without departing from the invention.

In one or more embodiments of the invention, the license generation manager (102) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the license generation manager (102) described throughout this application.

In one or more embodiments of the invention, the license generation manager (102) is implemented as computer instructions, e.g., computer code, stored on a persistent storage that when executed by a processor of the license generator (100) causes the license generator (100) to provide the functionality of the license generation manager (102) described throughout this application.

In one or more embodiments of the invention, the persistent storage (106) may store data. The data may include a license repository (108). The persistent storage (106) may store other and/or additional data without departing from the invention. The license repository may include one or more data structures that include licenses and/or copies of licenses generated by the license generation manager (102). For additional information regarding the license repository (108), refer to FIG. 2A.

The persistent storage (106) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (106) may utilize portions of any combination of hard disk drives, solid state disk drives, tape drives, and/or any other physical storage medium of any number of computing devices.

Figure 1E:
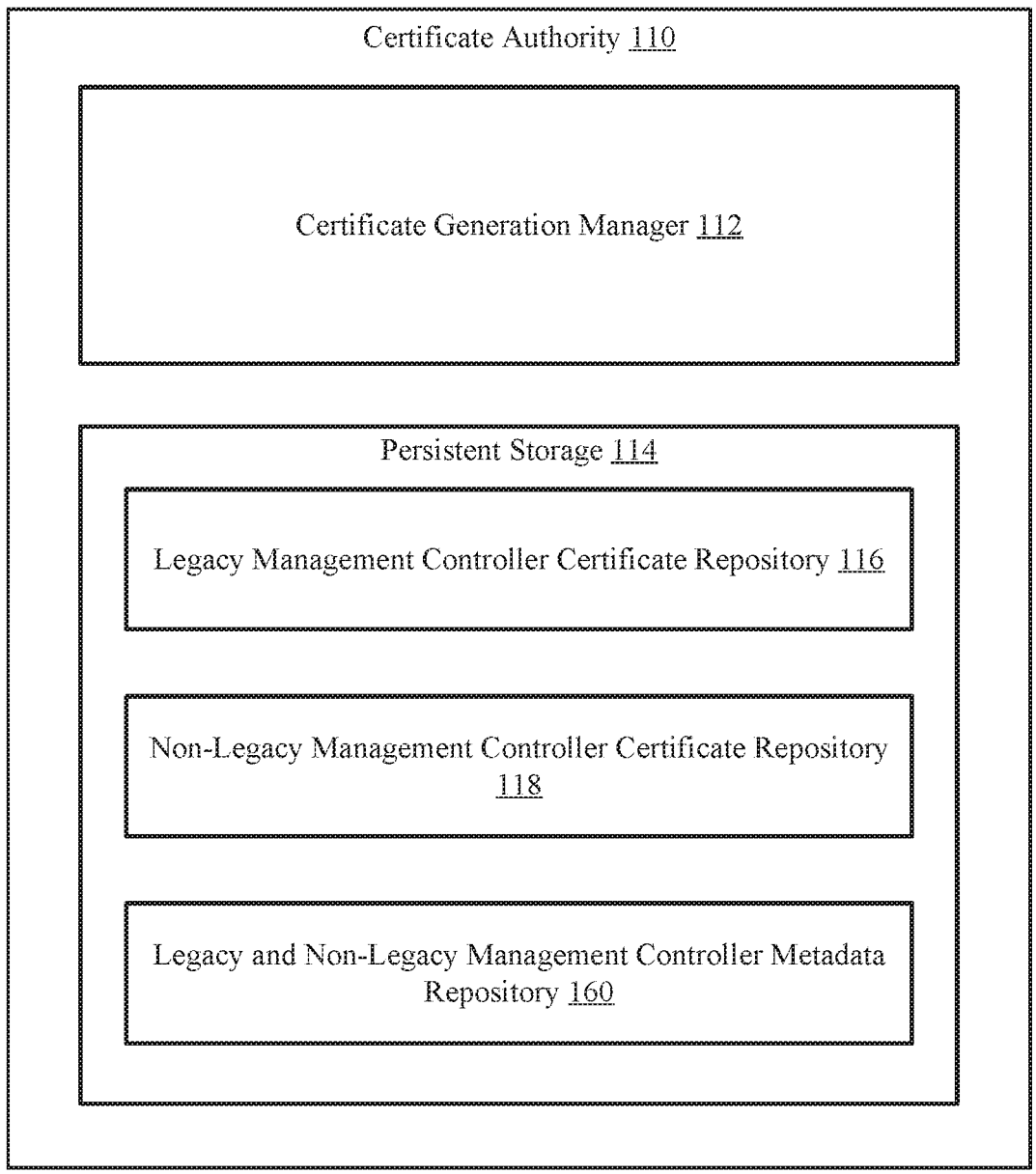
FIG. 1E shows a diagram of a certificate authority in accordance with one or more embodiments of the invention.

FIG. 1E shows a diagram of a certificate authority in accordance with one or more embodiments of the invention. The certificate authority (110) may be an embodiment of the certificate authority(ies) (110, FIG. 1A) discussed above. The certificate authority (110) may include the functionality to generate and provide management controller certificates to the license generator, management controllers, and/or other or additional components without departing from the invention. To provide the aforementioned functionality, the certificate authority (110) may include a certificate generation manager (112) and persistent storage (114). The certificate authority (110) may include other and/or additional components without departing from the invention. Each of the aforementioned components of the certificate authority (110) is discussed below.

The certificate generation manager (112) may include the functionality to generate and provide legacy and non-legacy management controller certificates to management controllers of information handling systems (120, FIG. 1A) and the license generator (100, FIG. 1A) using legacy and non-legacy management controller metadata obtained from the management controllers (e.g., 124 FIG. 1B) (e.g., 142, FIG. 1C) of the information handling systems (120, FIG. 1A). The certificate generation manager (112) may generate management controller certificates in response to certificate generation requests obtained from management controllers, the license generator (e.g., 100, FIG. 1A), and/or users of the system. In response to obtaining the certificate generation requests, the certificate generation manager (112) may obtain management controller metadata from the management controllers and generate management controller certificates using the management controller metadata. The certificate generation manager (112) may include other and/or additional functionality without departing from the invention.

In one or more embodiments of the invention, the certificate generation manager (112) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the certificate generation manager (112) described throughout this application.

In one or more embodiments of the invention, the certificate generation manager (112) is implemented as computer instructions, e.g., computer code, stored on a persistent storage that when executed by a processor of the certificate authority (110) causes the certificate authority (110) to provide the functionality of the certificate generation manager (112) described throughout this application.

In one or more embodiments of the invention, the persistent storage (114) stores data. The data may include one or more data structures. The data structures may include a legacy management controller certificate repository (116), a non-legacy management controller certificate repository (118), and a legacy and non-legacy management controller metadata repository (160). The persistent storage may store other and/or additional data without departing from the invention. Each of the aforementioned data structures stored in the persistent storage is discussed below.

The legacy management controller certificate repository (116) may be one or more data structures that include the legacy management controller certificates generated by the certificate generation manager (112). The legacy management controller certificates may be used to verify licenses installed in legacy management controllers (e.g., 124, FIG. 1B). For additional information regarding the legacy management controller certificate repository (116), refer to FIG. 2B.

The non-legacy management controller certificate repository (118) may be one or more data structures that include the non-legacy management controller certificates generated by the certificate generation manager (112). The non-legacy management controller certificates may be used to verify licenses installed in non-legacy management controllers (e.g., 142, FIG. 1C). For additional information regarding the non-legacy management controller certificate repository (118), refer to FIG. 2C.

The legacy and non-legacy management controller metadata repository (160) may be one or more data structures that include information regarding the legacy management controllers (e.g., 124, FIG. 1B) and the non-legacy management controllers (e.g., 142, FIG. 1C) of the information handling systems (120, FIG. 1A). The information may include, for example, legacy management controller identifiers that may be used to differentiate the legacy management controllers of the information handling systems (120, FIG. 1A). The information may also include, for example, non-legacy management controller identifiers that may be used to differentiate the non-legacy management controllers in the system. The legacy management controller identifiers and non-legacy management controller identifiers may be unique, global bit strings or character strings. The legacy and non-legacy management controller metadata may also include, for example, management controller generation identifiers that may be used to specify the generation (i.e., legacy management controller or non-legacy management controller) of a management controller. The legacy and non-legacy management controller metadata may include other and/or additional information regarding the legacy management controllers and the non-legacy management controllers included in the system without departing from the invention. The legacy and non-legacy management controller metadata may be generated by legacy and non-legacy management controllers and provided to the certificate authority (110) by the legacy and non-legacy management controllers. The certificate generation manager (112) may use the legacy and non-legacy management controller metadata included in the legacy and non-legacy management controller repository (160) to generate management controller public and private certificates.

Figure 2A:
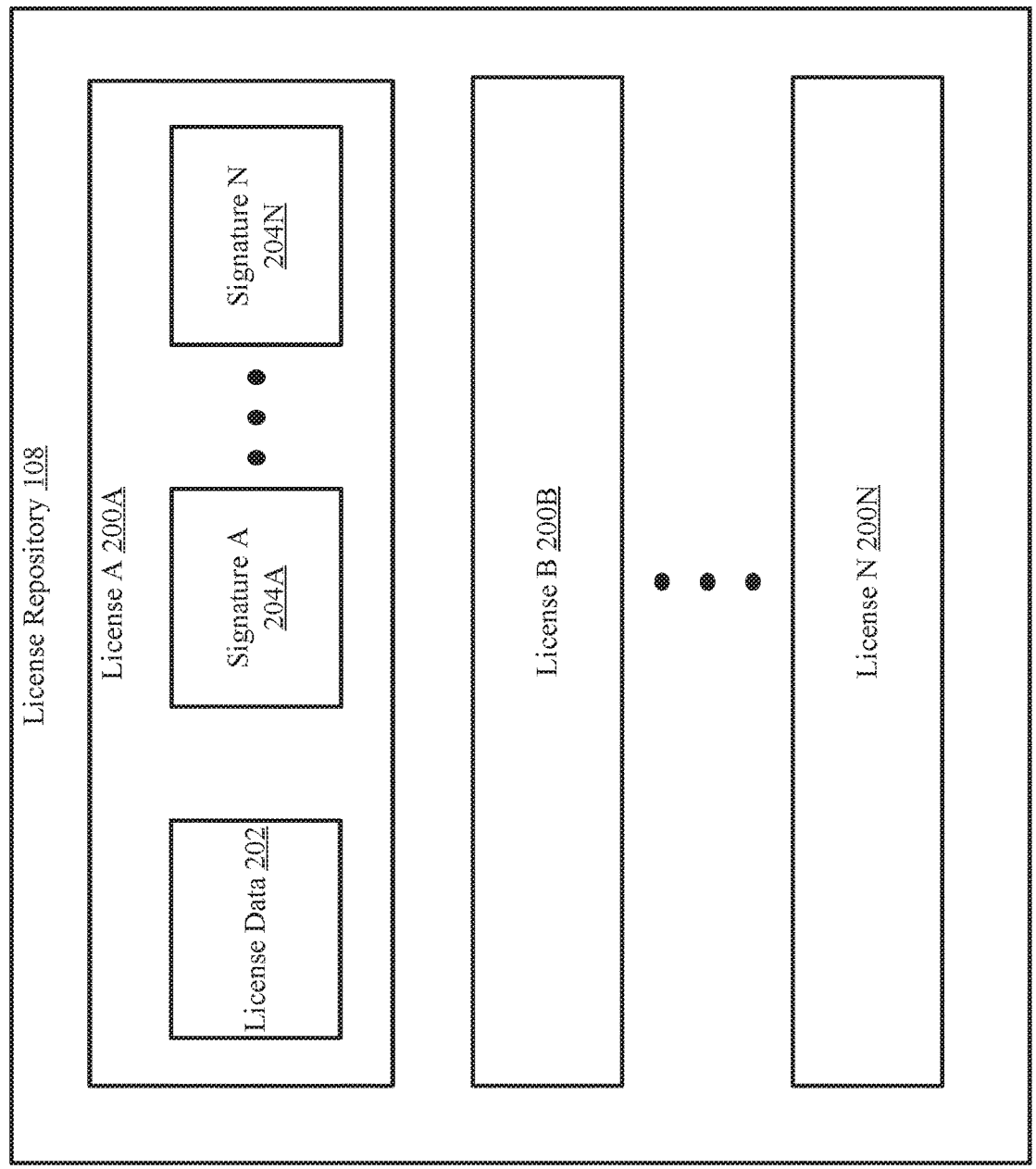
FIG. 2A shows a diagram of a license repository in accordance with one or more embodiments of the invention.

FIG. 2A shows a diagram of a license repository in accordance with one or more embodiments of the invention. The license repository (108) may be an embodiment of the license repository (108, FIG. 1D) discussed above. The license repository (108) may include one or more licenses, i.e., license A (200A), license B (200B), and license N (200N). The license repository (108) may include other and/or additional information and/or components without departing from the invention. Each license, e.g., license A (200A), may be a license that includes license data (202) and one or more signatures, i.e., signature A (204A) and signature N (204N). Each signature (e.g., 204A, 204N) may be signed by private key obtained from the same or different certificate authorities (e.g., 110, FIG. 1A) without departing from the invention. Each license (e.g., 200A, 200B, 200N) may include other and/or additional data without departing from the invention. Each license may be installed on one or multiple generations of devices (e.g., legacy management controllers and/or non-legacy management controllers). The license data (202) may be provided to the license generator (100, FIG. 1A) by users of the system through license generation requests. The license data (202) may include information regarding the license. The license data (202) may include a license identifier, a product description associated with the license (i.e., what is included in the license), devices compatible with the license (i.e., legacy management controllers and/or non-legacy management controllers), and license software data. The license data (202) may include other and/or additional data and/or information regarding the licenses without departing from the invention.

A license identifier may be a unique, global bit string or character string that may be used to differentiate a license (e.g., 200A) from other licenses (e.g., 200B, 200N). The product description may include information regarding the product associated with the license. The information included in the product description may include a product name, a vender selling the product, the product size, the functionality of the product, and other and/or additional information describing the product associated with the license without departing from the invention. The license software data may include computer instructions that may be stored, installed, and/or executed on the hardware components of a management controller (e.g., 124, FIG. 1B) and/or an information handling system (e.g., 120A, FIG. 1A) that allows a user to use the product associated with the license.

A signature (e.g., 204A, 204N) may be an encrypted bit string or character string generated using an encryption algorithm. The encryption algorithm may be any mathematical algorithm or function that inputs hashed data (e.g., hashed license data) and a private key (e.g., a legacy management controller private key or a non-legacy management controller private key) and may equal a signature generated using an encryption algorithm that inputs hashed data (e.g., hashed license data) and a public key (e.g., a legacy management controller public key or a non-legacy management controller public key). The signatures (e.g., 204A, 204N) may be generated by the license generation manager (102, FIG. 1B) of the license generator (100, FIG. 1A). The signatures may be used by the management controllers (e.g., 124, FIG. 1B) to verify if a license (e.g., 200A) is obtained from the license generator (100, FIG. 1A) and was not compromised in any way.

Figure 2B:
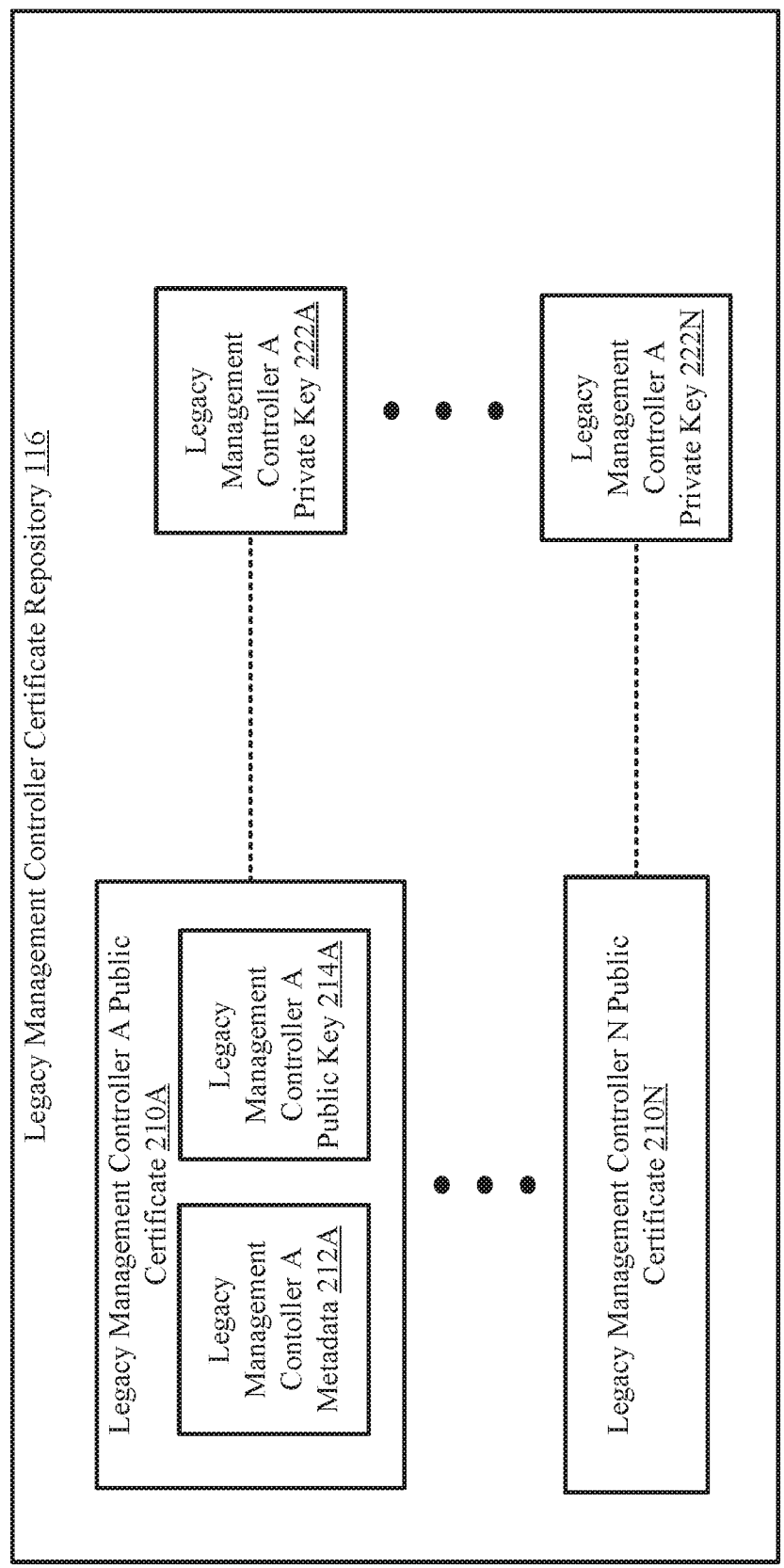
FIG. 2B shows a diagram of a legacy management controller certificate repository in accordance with one or more embodiments of the invention.

FIG. 2B shows a diagram of a legacy management controller certificate repository in accordance with one or more embodiments of the invention. The legacy management controller certificate repository (116) may be an embodiment of the legacy management controller certificate repository (116, FIG. 1E) discussed above. The legacy management controller certificate repository (116) may include one or more legacy management controller public certificates, i.e., legacy management controller A public certificate (210A) and legacy management controller N public certificate (210N). The legacy management controller certificate repository (116) may also include one or more legacy management controller private keys, i.e., legacy management controller A private key (222A) and legacy management controller N private key (222N). Each legacy management controller public certificate (e.g., 210A) may include legacy management controller metadata, e.g. legacy management controller A metadata (212A). Legacy management controller A metadata (212A) may include information associated with a legacy management controller (e.g., 124, FIG. 1B). The legacy management controller A metadata (212A) may be an embodiment of the legacy management controller metadata included in the legacy and non-legacy management controller metadata repository (160, FIG. 1E). For additional information regarding legacy management controller A metadata (212A), refer to FIG. 1E. Each legacy management controller public certificate (e.g., 210A) may also include a legacy management controller public key (e.g., legacy management controller A public key (214A)). Legacy management controller A public key (214A) may be a cryptographic key that may be available to any number of components illustrated in the system of FIG. 1A and may be used to generate signatures used to verify signatures included in licenses that were generated with an associated private key (e.g., legacy management controller A private key (222A)). Each legacy management controller public certificate (e.g., 210A, 210N) may include other and/or additional components without departing from the invention. Each legacy management controller public certificate (e.g., 210A, 210N) may be associated with a legacy management controller private key (e.g., 222A, 222N) (depicted by the dashed-lines in FIG. 2B).

Legacy management controller A private key (222A) may be a cryptographic key that may be available to only one component (e.g., the license generator (100, FIG. 1A)) of the components illustrated in the system of FIG. 1A and may be used to generate signatures included in licenses that may be verified by signatures generated with an associated public key (e.g., legacy management controller A public key (214A)).

Figure 2C:
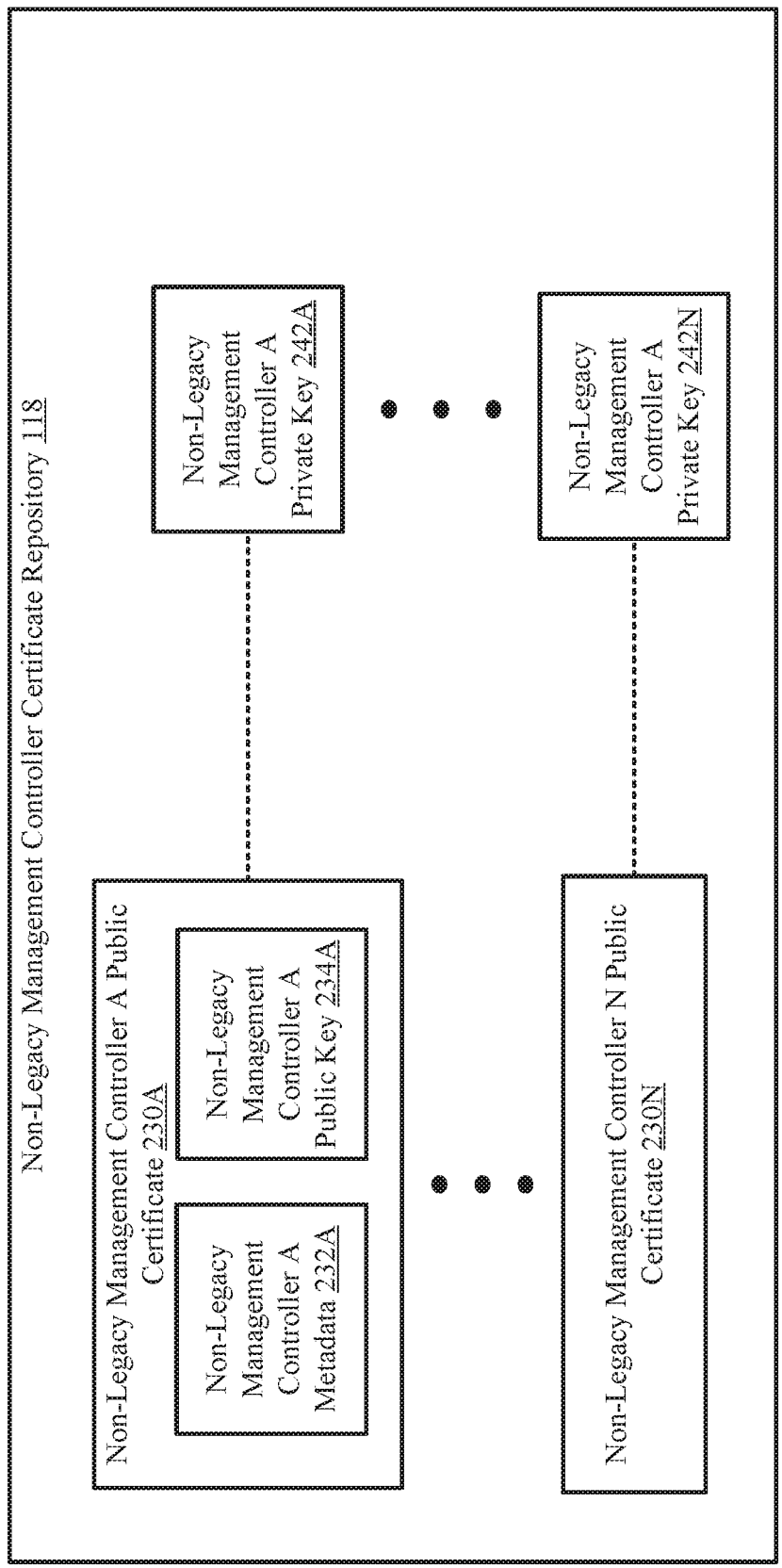
FIG. 2C shows a diagram of a non-legacy management controller certificate repository in accordance with one or more embodiments of the invention.

FIG. 2C shows a diagram of a non-legacy management controller certificate repository in accordance with one or more embodiments of the invention. The non-legacy management controller certificate repository (118) may be an embodiment of the non-legacy management controller certificate repository (118, FIG. 1E) discussed above. The non-legacy management controller certificate repository (118) may include one or more non-legacy management controller public certificates, i.e., non-legacy management controller A public certificate (230A) and non-legacy management controller N public certificate (230N). The non-legacy management controller certificate repository (118) may also include one or more non-legacy management controller private keys, i.e., non-legacy management controller A private key (242A) and non-legacy management controller N private key (242N). Each non-legacy management controller public certificate (e.g., 230A) may include non-legacy management controller metadata, e.g. non-legacy management controller A metadata (232A). Non-legacy management controller A metadata (232A) may include information associated with a non-legacy management controller (e.g., 142, FIG. 1C). The non-legacy management controller A metadata (232A) may be an embodiment of the non-legacy management controller metadata included in the legacy and non-legacy management controller metadata repository (160, FIG. 1E). For additional information regarding non-legacy management controller A metadata (232A), refer to FIG. 1E. Each non-legacy management public certificate (e.g., 230A) may also include a non-legacy management controller public key (e.g., non-legacy management controller A public key (234A)). Non-legacy management controller A public key (234A) may be a cryptographic key that may be available to any number of components illustrated in the system of FIG. 1A and may be used to generate signatures used to verify signatures included in licenses that were generated with an associated private key (e.g., non-legacy management controller A private key (242A)). Each non-legacy management controller public certificate (e.g., 230A, 230N) may include other and/or additional components without departing from the invention. Each non-legacy management controller public certificate (e.g., 230A, 230N) may be associated with a non-legacy management controller private key (e.g., 242A, 242N) (depicted by the dashed-lines in FIG. 2C).

Non-legacy management controller A private key (242A) may be a cryptographic key that may be available to only one component (e.g., the license generator (100, FIG. 1A) of the components illustrated in the system of FIG. 1A and may be used to generate signatures included in licenses that may be verified by signatures generated with an associated public key (e.g., non-legacy management controller A public key (234A)).

Figure 3A:
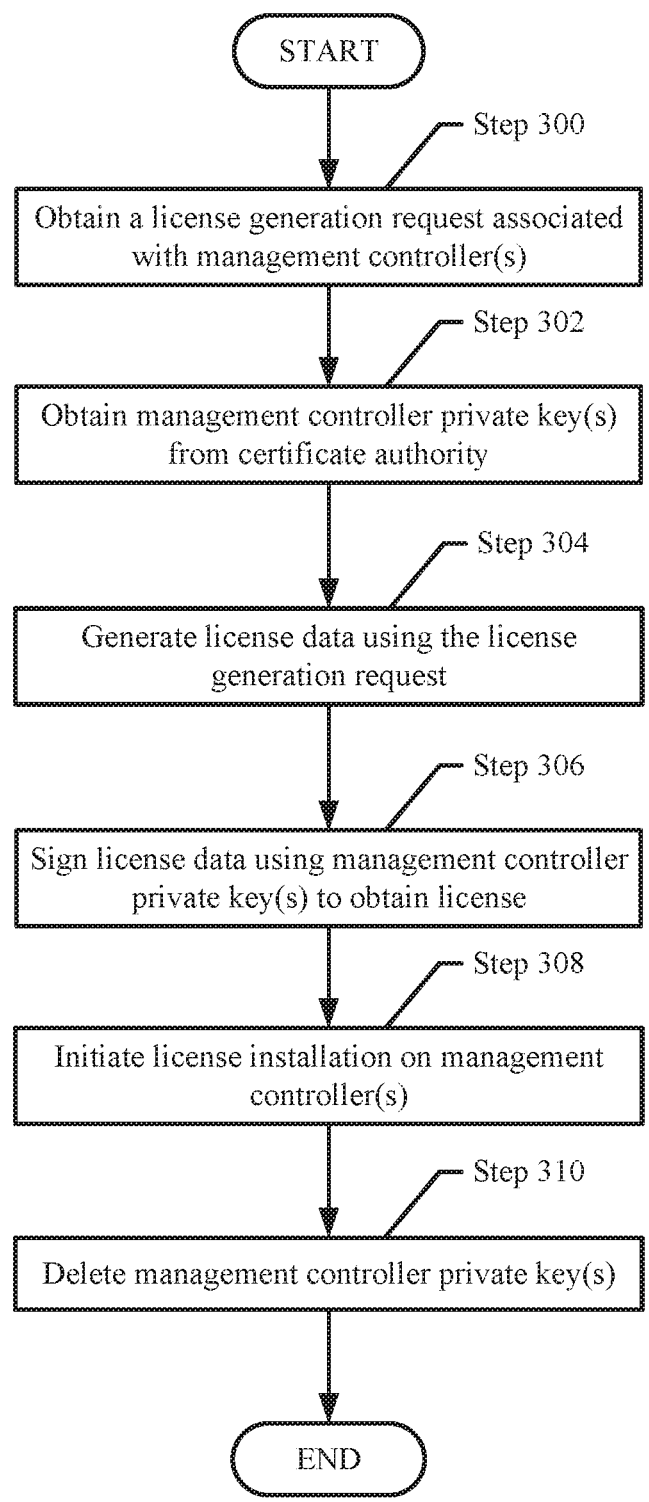
FIG. 3A shows a flowchart of a method for generating a license in accordance with one or more embodiments of the invention.

FIG. 3A shows a flowchart of a method, performed by the license generator, for generating a license in accordance with one or more embodiments of the invention. The method shown in FIG. 3A may be performed by, for example, the license generation manager (102, FIG. 1D) of the license generator (100, FIG. 1A) discussed above. Other components of the system illustrated in FIG. 1A may perform all, or a portion, of the method of FIG. 3A without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

In step 300, a license generation request associated with one or more management controllers is obtained. In one or more embodiments of the invention, a user of the system sends a message to the license generation manager. The message may include a license generation request. The license generation request may include all, or a portion, of the license data and the legacy management controller and/or non-legacy management controller identifiers associated with the license generation request. The legacy management controller and/or non-legacy management controller identifiers may be associated with one or more legacy management controllers and/or non-legacy management controllers in which the license is to be installed. The license generation request may include other and/or additional information without departing from the invention. The license generation request associated with one or more management controllers may be obtained via other and/or additional methods without departing from the invention.

In step 302, one or more management controller private certificates associated with the one or more management controllers are obtained from the certificate authority. In one or more embodiments of the invention, the license generation manager sends a message to the one or more certificate authorities included in the system. The message may include one or more requests for legacy management controller private certificates and/or non-legacy management controller private certificates associated with the one or more legacy management controllers and/or non-legacy management controllers targeted by the license generation request. The message may also include the one or more legacy management controller and/or non-legacy management controller identifiers. In response to obtaining the legacy management controller private certificate and/or non-legacy management controller private certificate requests, the one or more certificate authorities may identify one or more legacy management controller private certificates and/or non-legacy management controller private certificates that include the one or more legacy management controller and/or non-legacy management controller identifiers included in the requests for the one or more legacy management controller private certificates and/or non-legacy management controller private certificates. The one or more certificate authorities may send the identified one or more legacy management controller private certificates and/or non-legacy management controller private certificates to the license generation manager. The one or more management controller private certificates may be obtained via other and/or additional methods without departing from the invention.

In step 304, a license data is generated based on the license generation request. Said another way, the license generation request may specify various attributes (described of the license), which are then specified within the licensed data. The license data may also include all or a portion of the management controller metadata included in the management controller private certificates. The license data may be generated using other and/or additional methods and/or other or additional content without departing from the invention.

In step 306, the license data is signed using the one or more management controller private certificates to generate the license. In one or more embodiments of the invention, the license generation manager generates signatures using hashed license data and the one or more legacy management controller and/or non-legacy management controller private keys of the one or legacy management controller and/or non-legacy management controller private certificates. The license generation manager may apply the license data included in the license to a hash function to generate hashed license data. The hash function may be any function that maps data of an arbitrary size (e.g., license data) to data of a fixed sized (e.g., hashed license data) without departing from the invention. The license generation manager may then apply the hashed license data and each legacy management controller private key and/or non-legacy management controller private key to an encryption function to generate the signatures associated with the one or more legacy management controllers and/or non-legacy management controllers. The encryption function may be any function that applies hashed data and private keys to generate signatures without departing from the invention. The license generation manager may generate a signature associated with each targeted legacy management controller and non-legacy management controller.

The legacy management controller may include the signatures in the license in an ordered sequence. The license generation manager may place the signature associated with the one or more legacy management controllers in the first position of the ordered sequence. The license generation manager may place the signatures associated with the non-legacy management controllers in the following positions in the ordered sequence (e.g., second position, third position, etc.). The license generation manager may also include flags in the license. The flags may be associated with signatures or signature positions in the ordered sequence. The flags may be bits included in the license that are allocated to indicate whether a signature is associated with a particular generation (e.g., legacy or non-legacy) of management controller, that when set, indicate that the signature is associated with a specific generation. The license may be signed using the one or more management controller private certificates via other methods without departing from the invention.

In step 308, the license installation is initiated on the one or more management controllers. In one or more embodiments of the invention, the license generation manager may send one or messages to the one or more targeted legacy management controllers and/or non-legacy management controllers. The license management controller may identify the targeted legacy management controllers and/or non-legacy management controllers using the one or more legacy management controller and/or non-legacy management controller identifiers included in the license generation request. The messages may include requests to install the license on the one or more targeted legacy management controllers and/or non-legacy management controllers. The message may also include copies of the license. The license installation may be initiated on the one or more management controllers via other and/or additional methods without departing from the invention.

In step 310, the one or more management controller private certificates are deleted. In one or more embodiments of the invention, the license generation manager deletes all legacy management controller private certificates and/or non-legacy management controller private certificates from any storage. The deletion of the legacy management controller and/or non-legacy management controller private certificates may mitigate the risk of the private key included in the aforementioned legacy management controllers and/or non-legacy management controllers becoming compromised in any way. The one or more management controller private certificates may be deleted via other and/or additional methods without departing from the invention.

The method may end following step 310.

Figure 3B:
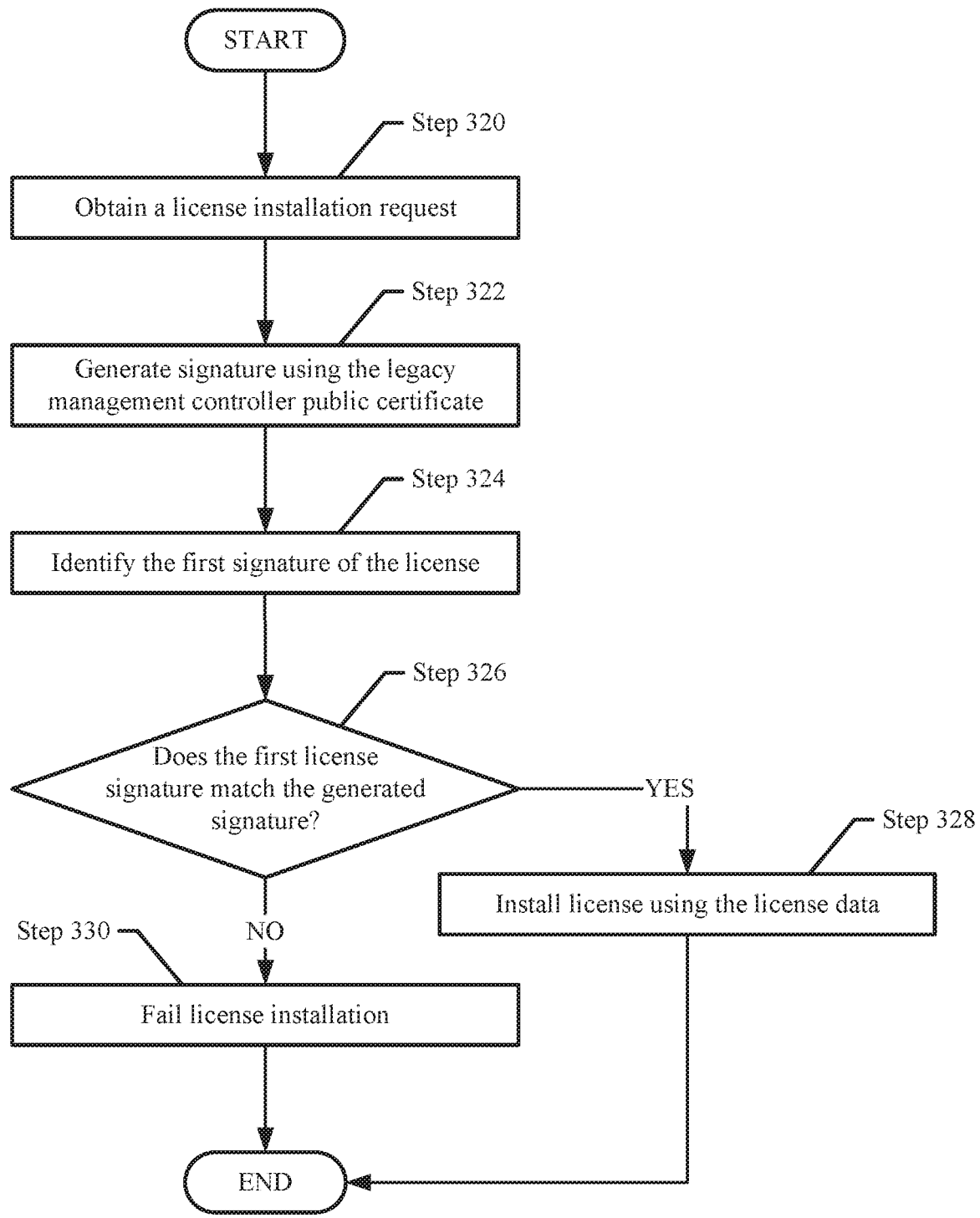
FIG. 3B shows a flowchart of a method, performed by legacy management controller, for verifying a license in accordance with one or more embodiments of the invention.

FIG. 3B shows a flowchart of a method, performed by legacy management controller, for verifying a license in accordance with one or more embodiments of the invention. The method shown in FIG. 3B may be performed by, for example, a legacy management controller (e.g., 124, FIG. 1B) of an information handling system (e.g., 120A, FIG. 1A) discussed above. Other components of the system illustrated in FIG. 1A may perform all, or a portion, of the method of FIG. 3B without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

In step 320, a license installation request is obtained. In one or more embodiments of the invention, the license generation manager of the license generator sends a message to the legacy management controller. The message may include a license installation request. The license installation request may include a license. The license installation request may include other and/or additional information without departing from the invention. The license installation request may be obtained via other and/or additional methods without departing from the invention.

In step 322, a signature is generated using the legacy management controller public certificate. In one or more embodiments of the invention, the legacy management controller generates a signature using the license data included in the license and the legacy management controller public key included in the legacy management controller public certificate. The legacy management controller may apply the license data included in the license to a hash function to generate hashed license data. The hash function may be any mathematical function that maps data of an arbitrary size (e.g., license data) to data of a fixed sized (e.g., hashed license data) as discussed above. The legacy management controller may then apply the hashed license data and the legacy management controller public key to an encryption function to generate a signature. The encryption function may be any function that applies hashed data and a public key to generate a signature without departing from the invention. The legacy management controller may generate a signature using the legacy management controller public certificate via other and/or additional methods without departing from the invention.

In step 324, the first signature of the license is obtained. In one or more embodiments of the invention, the legacy management controller identifies the first signature in the ordered sequence of signatures included in the license. As discussed above, the license may include an ordered sequence of signatures. The legacy management controller may only include the functionality to identify and compare the first signature in the ordered sequence of signatures included in the license. The legacy management controller may then identify and obtain the first signature in the ordered sequence of signatures included in the license. The first signature of the license may be obtained via other and/or additional methods without departing from the invention.

In step 326, a determination is made as to whether the first license signature matches the generated signature. In one or more embodiments of the invention, the legacy management controller compares the generated signature with the first license signature in the ordered sequence of license signatures to determine whether the generated signature associated with the legacy management controller public key matches the license signature associated with the legacy management controller private key. If the generated signature data is equal to the license signature data, then the legacy management controller may determine the first license signature matches the generated signature. If the generated signature data is not equal to the license signature data, then the legacy management controller may determine that the first license signature does not match the generated signature. The legacy management controller may make the determination of step 326 locally or by contacting a third party device which makes the determination via the method discussed in this step and provides the determination to the legacy management controller without departing from the invention. The determination as to whether the first license signature matches the generated signature may be made via other and/or additional methods without departing from the invention. If the legacy management controller determines that the first license signature matches the generated license signature, then the method proceeds to step 328. If the legacy management controller determines that the first license signature does not match the generated signature, then the method proceeds to step 330.

In step 328, the license is installed using the license data. In one or more embodiments of the invention, if the license signature was generated using a legacy management controller private key that is associated with the legacy management controller public key and matches the generated signature, then the license is determined to be legitimate and is verified to have come from the license generator and has not been compromised. The legacy management controller may store, install, and or execute all, or a portion, of the license data included in the license. As discussed above, the license data may include computer instructions that, when executed by a processor of the legacy management controller or the information handling system on which the legacy management controller is in, enables the processor to include the functionality associated with the license. The legacy management controller may send confirmation to the license generator that the license was successfully installed. The license may be installed using the license data via other and/or additional methods without departing from the invention.

The method may end following step 328.

In step 330, the license installation is failed. In one or more embodiments of the invention, if the license signature was not generated using the a legacy management controller private key that is associated with the legacy management controller public key or the license data was modified in any way and the license signature does not match the generated signature, then the legacy management controller invalidates the license. The legacy management controller may fail the installation of the license and delete the license. The legacy management controller may send a notification to the license generator that the license installation failed. The license installation may be failed via other and/or additional methods without departing from the invention.

The method may end following step 330.

Figure 3C:
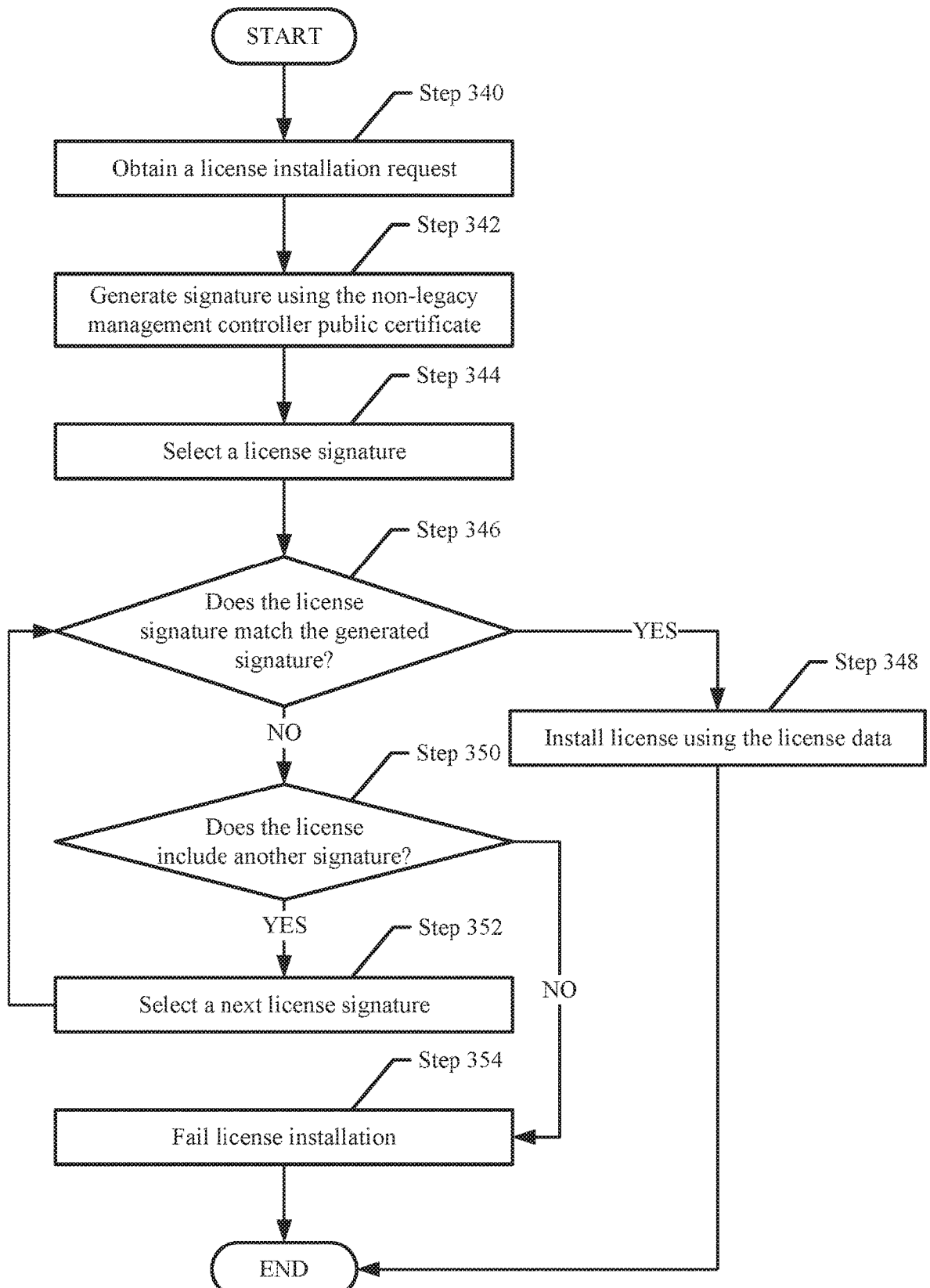
FIG. 3C shows a flowchart of a method, performed by non-legacy management controller, for verifying a license in accordance with one or more embodiments of the invention.

FIG. 3C shows a flowchart of a method, performed by a non-legacy management controller, for verifying a license in accordance with one or more embodiments of the invention. The method shown in FIG. 3C may be performed by, for example, a non-legacy management controller (e.g., 142, FIG. 1C) of an information handling system (e.g., 120N, FIG. 1A) discussed above. Other components of the system illustrated in FIG. 1A may perform all, or a portion, of the method of FIG. 3C without departing from the invention. While various steps in the flowchart are presented and described sequentially, one of ordinary skill in the relevant art will appreciate that some or all of the steps may be executed in different orders, may be combined or omitted, and some or all of the steps may be executed in parallel.

In step 340, a license installation request is obtained. In one or more embodiments of the invention, the license generation manager of the license generator sends a message to the non-legacy management controller. The message may include a license installation request. The license installation request may include a license. The license installation request may include other and/or additional information without departing from the invention. The license installation request may be obtained via other and/or additional methods without departing from the invention.

In step 342, a signature is generated using the non-legacy management controller public certificate. In one or more embodiments of the invention, the non-legacy management controller generates a signature using the license data included in the license and the non-legacy management controller public key included in the non-legacy management controller public certificate. The non-legacy management controller may apply the license data included in the license to a hash function to generate hashed license data. The hash function may be any mathematical function that maps data of an arbitrary size (e.g., license data) to data of a fixed sized (e.g., hashed license data) as discussed above. The non-legacy management controller may then apply the hashed license data and the non-legacy management controller public key to an encryption function to generate a signature. The encryption function may be any mathematical function that applies hashed data and a public key to generate a signature without departing from the invention. The non-legacy management controller may generate a signature using the non-legacy management controller public certificate via other and/or additional methods without departing from the invention.

In step 344, a license signature is selected. In one or more embodiments of the invention, the non-legacy management controller identifies the first signature in the ordered sequence of signatures included in the license. As discussed above, the license may include an ordered sequence of signatures. The non-legacy management controller may only include the functionality to identify and compare the each signature in the ordered sequence of signatures included in the license. The non-legacy management controller may then identify and obtain the first signature in the ordered sequence of signatures included in the license. A license signature may be selected via other and/or additional methods without departing from the invention.

In one or more embodiments of the invention, the signatures included in the license are associated with management controller generation flags. As discussed above, the management controller generation flags may indicate whether a signature is associated with a legacy management controller or a non-legacy management controller. The non-legacy management controller may identify a subset of license signatures that are associated with a non-legacy management controller flag included in the license. The non-legacy management controller may select the first signature in the ordered sequence of the subset of license signatures. A license signature may be selected via other and/or additional methods without departing from the invention.

In step 346, a determination is made as whether the license signature matches the generated signature. In one or more embodiments of the invention, the non-legacy management controller compares the generated signature with the selected license signature to determine whether the generated signature associated with the non-legacy management controller public key matches the selected license signature associated with the legacy management controller private key. If the generated signature data is equal to the selected license signature data, then the non-legacy management controller may determine the selected license signature matches the generated signature. If the generated signature data is not equal to the selected license signature data, then the non-legacy management controller may determine that the selected license signature does not match the generated signature. The non-legacy management controller may make the determination of step 346 locally or by contacting a third party device which makes the determination via the method discussed in the step and provides the determination to the non-legacy management controller without departing from the invention. The determination as to whether the selected license signature matches the generated signature may be made via other and/or additional methods without departing from the invention.

If the non-legacy management controller determines that the selected license signature matches the generated license signature, then the method proceeds to step 348. If the legacy management controller determines that the selected license signature does not match the generated signature, then the method proceeds to step 350.

In step 348, the license is installed using the non-legacy management controller public certificate. In one or more embodiments of the invention, if the selected license signature was generated using a non-legacy management controller private key that is associated with the non-legacy management controller public key and matches the generated signature, then the non-legacy management controller determines the license is legitimate and verifies that the license comes from the license generator and has not been compromised. The non-legacy management controller may store, install, and/or execute all, or a portion, of the license data included in the license. As discussed above, the license data may include computer instructions that, when executed by a processor of the non-legacy management controller or the information handling system on which the non-legacy management controller operates, enables the processor to include the functionality associated with the license. The non-legacy management controller may send confirmation to the license generator that the license was successfully installed. The license may be installed using the license data via other and/or additional methods without departing from the invention.

The method may end following step 348.

In step 350, a determination is made as to whether the license includes another signature. In one or more embodiments of the invention, the non-legacy management controller checks the signatures included in the license. If the non-legacy management controller identifies an additional license signature that is not a previously selected license signature, the non-legacy management controller may determine that the license includes another signature. If the non-legacy management controller does not identify an additional license signature that is not a previously selected license signature, the non-legacy management controller may determine that the license does not include another signature. The determination as to whether the license includes another signature may be made via other and/or additional methods without departing from the invention.

In one or more embodiments of the invention, the non-legacy management controller checks the subset of signatures associated with a non-legacy management controller flag. If the non-legacy management controller identifies an additional license signature that is not a previously selected license signature included in the subset of license signatures, the non-legacy management controller may determine that the license includes another signature. If the non-legacy management controller does not identify an additional signature that is not a previously selected license included in the subset of license signatures, then the non-legacy management controller may determine that the license does not include an additional signature. The determination as to whether the license includes an additional signature may be made via other and/or additional methods without departing from the invention.

If the non-legacy management controller determines that the license includes and additional signature, then the method proceeds to step 352. If the non-legacy management controller determines that the license does not include and additional signature, then the method proceeds to step 354.

In step 352, a next license signature is selected. In one or more embodiments of the invention, the non-legacy management controller identifies the next signature in the ordered sequence of signatures included in the license. As discussed above, the license may include an ordered sequence of signatures. The non-legacy management controller may include the functionality to identify and compare the each signature in the ordered sequence of signatures included in the license. The non-legacy management controller may then identify and obtain the next signature in the ordered sequence of signatures included in the license. For example, the previously selected signature may be the first license signature included in the ordered sequence of license signatures. The non-legacy management controller may then select the license signature that is in the second position of the ordered sequence of signatures as the next license signature. A next license signature may be selected via other and/or additional methods without departing from the invention.

In one or more embodiments of the invention, the signatures included in the license are associated with management controller generation flags. As discussed above, the management controller generation flags may indicate whether a signature is associated with a legacy management controller or a non-legacy management controller. The non-legacy management controller may identify a subset of license signatures that are associated with a non-legacy management controller flag included in the license. The non-legacy management controller may select the next signature in the ordered sequence of the subset of license signatures as discussed above. A next license signature may be selected via other and/or additional methods without departing from the invention.

In step 354, the license installation is failed. In one or more embodiments of the invention, if the license signature was not generated using the a non-legacy management controller private key that is associated with the non-legacy management controller public key or the license data was modified in any way and the license signature does not match the generated signature, then the non-legacy management controller invalidates the license. The non-legacy management controller may fail the installation of the license and delete the license. The non-legacy management controller may send a notification to the license generator that the license installation failed. The license installation may be failed via other and/or additional methods without departing from the invention.

The method may end following step 354.

Example

Figure 4A:
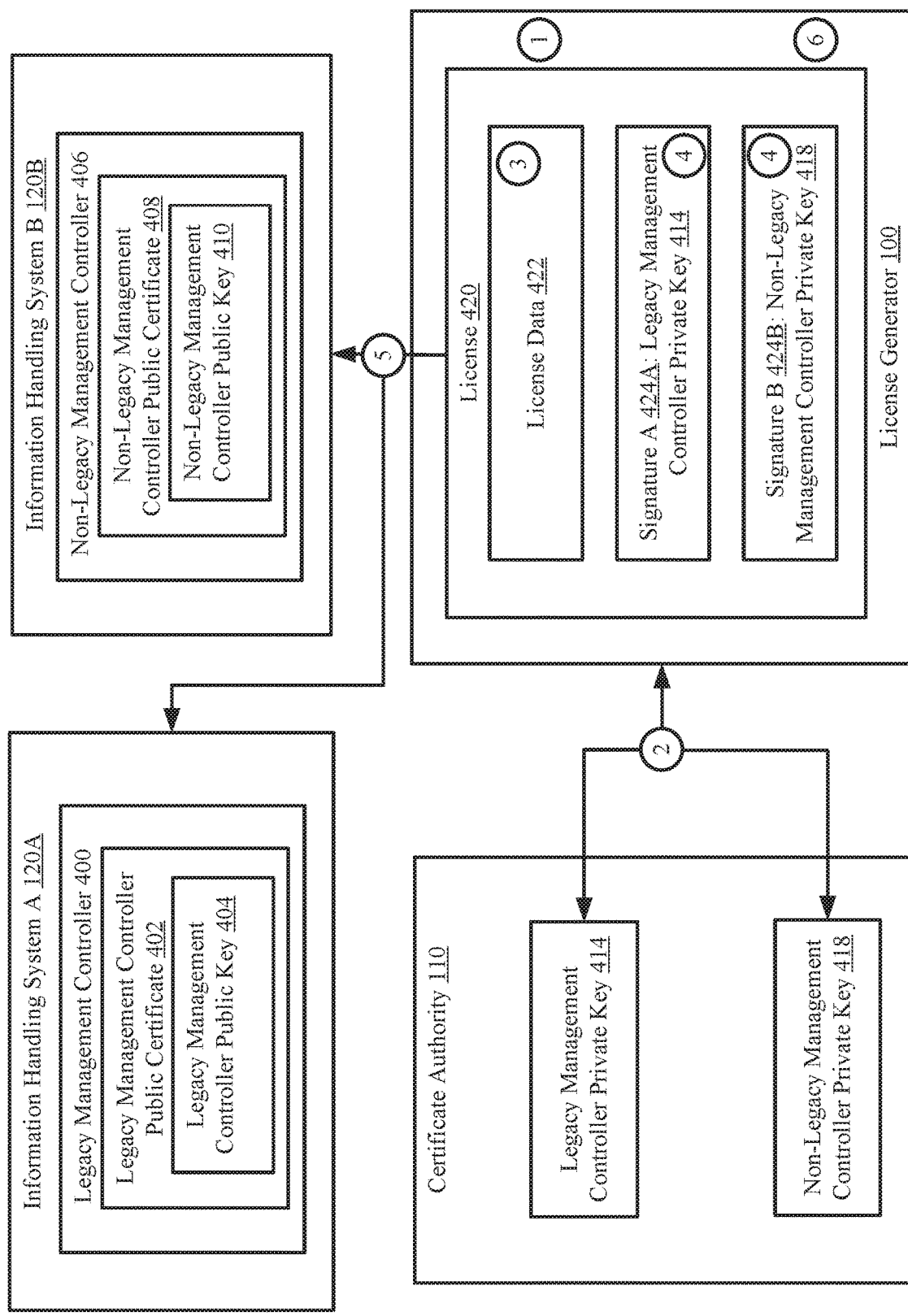
FIGS. 4A-4B show a diagram of an example in accordance with one or more embodiments of the invention.
Figure 4B:
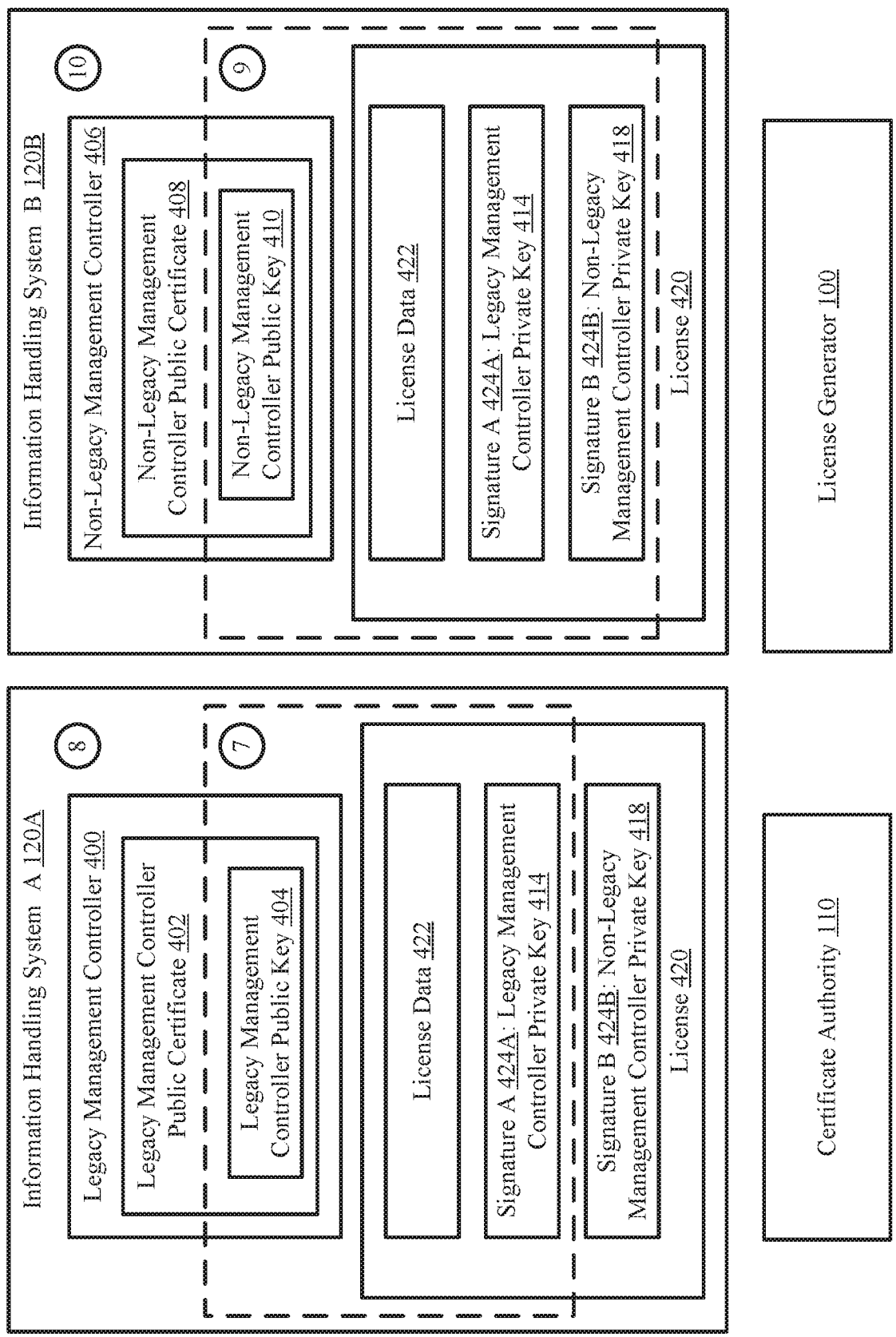

FIGS. 4A and 4B show a diagram of an example in accordance with one or more embodiments of the invention. The example is not intended to limit the invention. Consider a scenario in which a license generator generates a license for two management controllers.

Turning to FIG. 4A, the license generator (100) obtains a license generation request from a user of the system [1]. The license generation request targets both the legacy management controller (400) of information handling system A (120A) and the non-legacy management controller (406) of information handling system B (120B). The license generator (100) then obtains a legacy management controller private key (414) associated with the legacy management controller (400) and a non-legacy management controller private key (418) associated with non-legacy management controller (406) [2]. The license generator (100) then generates a license data (422) using the license generation request, the legacy management controller private key (414), and the non-legacy management controller private key (418) [3].

The license generator (100) then signs the license data (422) using the legacy management controller private key (414) of the legacy management controller private certificate (412) and the non-legacy management controller private key (418) of the non-legacy management controller private certificate (416) to generate two signatures, signature A (424A) and signature B (424B). The result of this step is the license (420) [4]. After generating the license (420), the license generator (100) sends the license (420) to both the legacy management controller (400) and the non-legacy management controller (406) [5]. The license generator (100) then deletes the legacy management controller private certificate (412) and the non-legacy management controller private certificate (416) [6].

Turning to FIG. 4B, upon receiving the license (420), the legacy management controller (400) checks the first signature, signature A (424A), included in the license (420) because the legacy management controller (400) is an older generation management controller and only includes the functionality to check the first signature of a license. The legacy management controller (400) then generates a signature using the legacy management controller public key (404) of the legacy management controller public certificate (402). The legacy management controller (400) verifies that signature A (424) was signed with the legacy management controller private key (414) because signature A (424A) matches the signature generated using the license data (422) and the legacy management controller public key (404) of the legacy management controller public certificate (402) [7]. If the aforementioned matching attempt had failed, then the license would not be installed on information handling system A (120A) or the legacy management controller (400) because the legacy management controller (400) only includes functionality to perform one attempt to match the generated signature with the first signature in the ordered sequence of signatures in the license (i.e., signature A (424A)). The legacy management controller (400) then installs the license (420) [8].

After receiving the license (420), the non-legacy management controller (406) generates a signature using the non-legacy management controller public key (410) of the non-legacy management controller public certificate (408). The non-legacy management controller (406) sequentially checks both signature A (424A) and signature B (424B) included in the license (420) against the generated signature. The non-legacy management controller (406) is a newer generation management controller and, as such, includes functionality to check multiple signatures in a single license. The non-legacy management controller (406) first attempts to match the generated signature with signature A (424A). This attempt to match fails. The non-legacy management controller (406) then attempts to match the generated signature with signature B (424B). The generated signature generated using the non-legacy management controller public key (410) of the non-legacy management controller public certificate (408) matches signature B (424B) because signature B (424B) was generated using the non-legacy management controller private key (418) [9]. Based on the verification, the non-legacy management controller (406) installs the license (420) [10].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may be implemented using instructions executed by one or more processors of the data management device. Further, such instructions may correspond to computer readable instructions that are stored on one or more non-transitory computer readable mediums.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for verifying licenses, the method comprising:
obtaining, by a legacy management controller, a first license installation request and a license, wherein the license comprises license data and a plurality of signatures;
in response to the first license installation request:
making a first determination, by the legacy management controller, that a first signature of the plurality of signatures is valid, wherein the validation of the first signature is performed using a legacy management controller public certificate associated with the legacy management controller;

in response to the first determination:
  installing, by the legacy management controller, the license on the legacy management controller;
  obtaining, by a non-legacy management controller, a second license installation request and the license;
in response to the second license installation request:
  making a second determination, by the non-legacy management controller, that a second signature of the plurality of signatures is valid, wherein the validation of the second signature is performed using a non-legacy management controller public certificate associated with the non-legacy management controller; and
  in response to the second determination:
    installing, by the non-legacy management controller, the license on the non-legacy management controller,
wherein the plurality of signatures is maintained in a data structure that maintains the plurality of signatures in an ordered sequence, wherein the first signature is in a first position in the ordered sequence, wherein the legacy management controller is configured to only perform a validation on a signature in the first position in the ordered sequence, wherein the legacy management controller is at least one circuity.

2. The method of claim 1, wherein making the first determination comprises:
  identifying, by the legacy management controller, the first signature of the plurality of signatures.

3. The method of claim 1, wherein making the second determination comprises:
  identifying, by the non-legacy management controller, the first signature of the plurality of signatures, wherein the first signature is in a first position in an ordered sequence;
  generating, by the non-legacy management controller, a signature using the non-legacy management controller public certificate;
  making a third determination, by the non-legacy management controller, that the first signature does not match the generated signature;
  in response to the third determination: making a fourth determination, by the non-legacy management controller, that the license includes another signature; and
  in response to the fourth determination: selecting, by the non-legacy management controller, the second signature of the plurality of signatures, wherein the second signature is in a second position in the ordered sequence.

4. The method of claim 1, further comprising:
  prior to obtaining the first license installation request;
    obtaining, by a license generator, a license generation request associated with management controllers, wherein the management controllers comprise the legacy management controller and the non-legacy management controller;
  in response to obtaining the license generation request:
    obtaining a legacy management controller private key associated with the legacy management controller and a non-legacy management controller private key associated with the non-legacy management controller from a certificate authority;
    generating the license using legacy management controller metadata private key, non-legacy management metadata key, and the license generation request;
    signing the license using the legacy management controller private key and the non-legacy management controller private key;
    initiating, after signing, license installation on the management controllers; and
    deleting the legacy management controller private key and the non-legacy management controller private key.

5. The method of claim 4, wherein the legacy management controller private key is associated with the legacy management controller public certificate and the non-legacy management controller private key is associated with the non-legacy management controller public certificate.

6. A system, comprising:
  a legacy management controller comprising at least one circuitry configured to:
    obtain a first license installation request and a license, wherein the license comprises license data and a plurality of signatures;
    in response to the first license installation request:
      make a first determination that a first signature of the plurality of signatures is valid, wherein the validation of the first signature is performed using a legacy management controller public certificate associated with the legacy management controller;
      in response to the first determination:
        install the license on the legacy management controller; and
  a non-legacy management controller comprising at least one circuitry configured to:
    obtain, a second license installation request and the license;
    in response to the second license installation request:
      make a second determination that a second signature of the plurality of signatures is valid, wherein the validation of the second signature is performed using a non-legacy management controller public certificate associated with the non-legacy management controller; and
      in response to the second determination:
        install the license on the non-legacy management controller,
  wherein the plurality of signatures is maintained in a data structure that maintains the plurality of signatures in an ordered sequence, wherein the first signature is in a first position in the ordered sequence, wherein the legacy management controller is configured to only perform a validation on a signature in the first position in the ordered sequence.

7. The system of claim 6, wherein making the first determination comprises:
  identifying the first signature of the plurality of signatures.

8. The system of claim 6, wherein making the second determination comprises:
  identifying the first signature of the plurality of signatures, wherein the first signature is in a first position in an ordered sequence;
  generating a signature using the non-legacy management controller public certificate;
  making a third determination that the first signature does not match the generated signature;
  in response to the third determination:
    making a fourth determination that the license includes another signature; and in response to the fourth determination: selecting the second signature of the plurality of signatures, wherein the second signature is in a second position in the ordered sequence.

9. The system of claim 6, further comprising:

a license generator comprising at least one circuitry configured to:
  obtain a license generation request associated with management controllers, wherein the management controllers comprise the legacy management controller and the non-legacy management controller;
  in response to obtaining the license generation request:
    obtain a legacy management controller private certificate associated with the legacy management controller and a non-legacy management controller private certificate associated with the non-legacy management controller from a certificate authority;
    generate the license using the legacy management controller private certificate, the non-legacy management controller private certificate, and the license generation request;
    sign the license using the legacy management controller private certificate and the non-legacy management controller private certificate;
    initiate, after signing, license installation on the management controllers; and
    deleting the legacy management controller private key and the non-legacy management controller private key.

10. The system of claim 9, wherein the legacy management controller private key is associated with the legacy management controller public certificate and the non-legacy management controller private key is associated with the non-legacy management controller public certificate.

11. A non-transitory computer readable medium comprising computer readable program code, which when executed by a computer processor causes the computer processor to perform a method for verifying licenses, the method comprising:
  obtaining a license installation request and the license, wherein the license comprises license data and a plurality of signatures;
  in response to the license installation request:
    making a determination that a first signature of the plurality of signatures is not valid using a non-legacy management controller public certificate associated with a non-legacy management controller wherein the determination of the validity of the first signature is performed by generating a signature using a public key of the non-legacy management controller in the public certificate and comparing the generated signature with the first signature;
    making a determination that a second signature of the plurality of signatures is valid, wherein the validation of the second signature is performed using the non-legacy management controller public certificate associated with the non-legacy management controller wherein the determination of the validity of the second signature is performed by comparing the generated signature with the second signature; and
    in response to the second determination:
      installing the license on the non-legacy management controller,
  wherein the plurality of signatures is maintained in a data structure that maintains the plurality of signatures in an ordered sequence, wherein the first signature is in a first position in the ordered sequence.

12. The non-transitory computer readable medium of claim 11, wherein making the determination comprises: identifying, by the non-legacy management controller, the first signature of the plurality of signatures.

13. The non-transitory computer readable medium of claim 11, wherein making the determination further comprises:
  identifying the first signature of the plurality of signatures, wherein the first signature is in a first position in an ordered sequence.

14. The non-transitory computer readable medium of claim 13, wherein making the second determination comprises: selecting, by the non-legacy management controller, the second signature of the plurality of signatures, wherein the second signature is in a second position in the ordered sequence.

15. The non-transitory computer readable medium of claim 11, wherein a first signature of the plurality of signatures is signed by a legacy management controller private key and wherein the second signature of the plurality of signatures is signed by a non-legacy management controller private key.

* * * * *